US010292066B2

(12) United States Patent
Sastry et al.

(10) Patent No.: US 10,292,066 B2
(45) Date of Patent: May 14, 2019

(54) SYSTEM AND METHOD OF MODIFYING CONGESTION CONTROL BASED ON MOBILE SYSTEM INFORMATION

(75) Inventors: Venkateshwara Sastry, Bangalore (IN); Pandurangan R. Sankarlal, Bangalore (IN); Krishna P. Komarath, Bangalore (IN); Navjyot Ramteke, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1510 days.

(21) Appl. No.: 13/289,604

(22) Filed: Nov. 4, 2011

(65) Prior Publication Data

US 2013/0114408 A1 May 9, 2013

(51) Int. Cl.
*H04W 28/02* (2009.01)
*H04L 12/801* (2013.01)
*H04L 12/807* (2013.01)

(52) U.S. Cl.
CPC ........... *H04W 28/02* (2013.01); *H04L 47/193* (2013.01); *H04L 47/27* (2013.01); *H04L 47/37* (2013.01); *H04W 28/0205* (2013.01)

(58) Field of Classification Search
CPC .. H04W 28/02; H04W 28/0205; H04L 47/37; H04L 47/27; H04L 47/193
USPC ........................................................ 370/231
See application file for complete search history.

(56) References Cited

U.S. PATENT DOCUMENTS

| 6,415,329 | B1* | 7/2002 | Gelman et al. ............... 709/245 |
| 6,438,101 | B1* | 8/2002 | Kalampoukas ......... H04L 47/10 370/229 |
| 6,741,555 | B1* | 5/2004 | Li ........................... H04L 47/10 370/229 |
| 7,299,280 | B2* | 11/2007 | Gerla et al. ................... 709/224 |
| 7,577,097 | B2* | 8/2009 | Tan et al. ....................... 370/237 |
| 7,643,442 | B1 | 1/2010 | Calhoun |
| 7,925,775 | B2* | 4/2011 | Nishida ........................ 709/232 |
| 8,406,133 | B2* | 3/2013 | Yeung et al. ................. 370/231 |
| 9,391,911 | B1* | 7/2016 | Anderson ............. H04L 1/1628 |
| 2002/0046264 | A1* | 4/2002 | Dillon ................ H04B 7/18584 709/219 |
| 2002/0097722 | A1* | 7/2002 | Liao ....................... H04L 47/10 370/392 |

(Continued)

OTHER PUBLICATIONS

Luca De Cicco and Saverio Mascolo,—TCP Congestion Control over 3G Communication Systems, 2007, Springer Berlin Heidelberg, vol. 4712, pp. 73-85.*

(Continued)

*Primary Examiner* — Noel R Beharry
*Assistant Examiner* — Wilfred Thomas
(74) *Attorney, Agent, or Firm* — Patterson + Sheridan, LLP

(57) ABSTRACT

This disclosure relates to a system and method for modifying selected network congestion control parameters using mobile system information. The congestion control modification improves network performance between a remote server on the Internet and a mobile device. As the proliferation of data-rich content and increasingly more capable mobile devices has continued, mobile consumers increasingly demand better network performance from their mobile devices and mobile infrastructure. This disclosure provides systems and methods for using mobile system information related to Quality of Service guarantees to modify network congestion control.

26 Claims, 11 Drawing Sheets

(56) References Cited

U.S. PATENT DOCUMENTS

| | | | |
|---|---|---|---|
| 2004/0243703 A1* | 12/2004 | Demmer | H04L 29/06 709/224 |
| 2005/0033857 A1* | 2/2005 | Imiya | H04L 29/06 709/232 |
| 2005/0058131 A1* | 3/2005 | Samuels et al. | 370/389 |
| 2005/0170841 A1* | 8/2005 | Sagfors | 455/453 |
| 2006/0007934 A1* | 1/2006 | Chemiakina et al. | 370/395.4 |
| 2006/0291435 A1* | 12/2006 | Hirsimaki et al. | 370/338 |
| 2007/0025301 A1* | 2/2007 | Petersson et al. | 370/338 |
| 2007/0076626 A1* | 4/2007 | Wise | H04L 1/1825 370/252 |
| 2007/0115814 A1* | 5/2007 | Gerla | H04L 1/0002 370/230 |
| 2008/0089250 A1* | 4/2008 | Jung | 370/276 |
| 2008/0137615 A1* | 6/2008 | Park | H04L 45/302 370/332 |
| 2009/0168720 A1* | 7/2009 | Vinayakray-Jani et al. | 370/331 |
| 2009/0172184 A1* | 7/2009 | Wason | H04L 47/10 709/234 |
| 2009/0296581 A1* | 12/2009 | Mekkattuparamban et al. | 370/235 |
| 2010/0110989 A1* | 5/2010 | Wu et al. | 370/328 |
| 2011/0035584 A1* | 2/2011 | Meyerstein et al. | 713/155 |
| 2011/0261695 A1* | 10/2011 | Zhao | H04L 47/29 370/232 |
| 2012/0054809 A1* | 3/2012 | Chowdhury et al. | 725/93 |

OTHER PUBLICATIONS

M. Allman, V. Paxson and W. Stevens—TCP Congestion Control, Request for Comments: 2581, Apr. 1999.*

Nanditad, Tiziana, Ycheng, Hkchu, Therbert, Aagarwal, Arvind, Nsutin, An Argument for Increasing TCP's Initial Congestion Window, Jul. 2010, ACM Computer communication review vol. 40, No. 3, 27-33.*

* cited by examiner

SYSTEM AND METHOD OF MODIFYING CONGESTION CONTROL BASED ON MOBILE SYSTEM INFORMATION

FIELD OF THE DISCLOSURE

This disclosure relates generally to mobile wireless networking, and specifically to a system and method for using mobile wireless network information to modify network protocol performance.

BACKGROUND

Wireless networks are telecommunications networks that use radio waves to carry information from one node in the network to one or more receiving nodes in the network. Cellular telephony may be characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. These applications communicate over a network such as the Internet using a variety of specific network protocols. Example network protocols include Transmission Control Protocol (TCP), Internet Protocol (IP), Transport Layer Security (TLS) and Secure Sockets Layer (SSL), User Datagram Protocol (UDP), File Transfer Protocol (FTP), Hypertext Transfer Protocol (HTTP), and Point-to-Point Protocol (PPP). These network protocols are relied upon by major Internet applications such as the World Wide Web, email, remote administration, and file transfer.

DESCRIPTION OF EXAMPLE EMBODIMENTS

Overview

Figure 1:
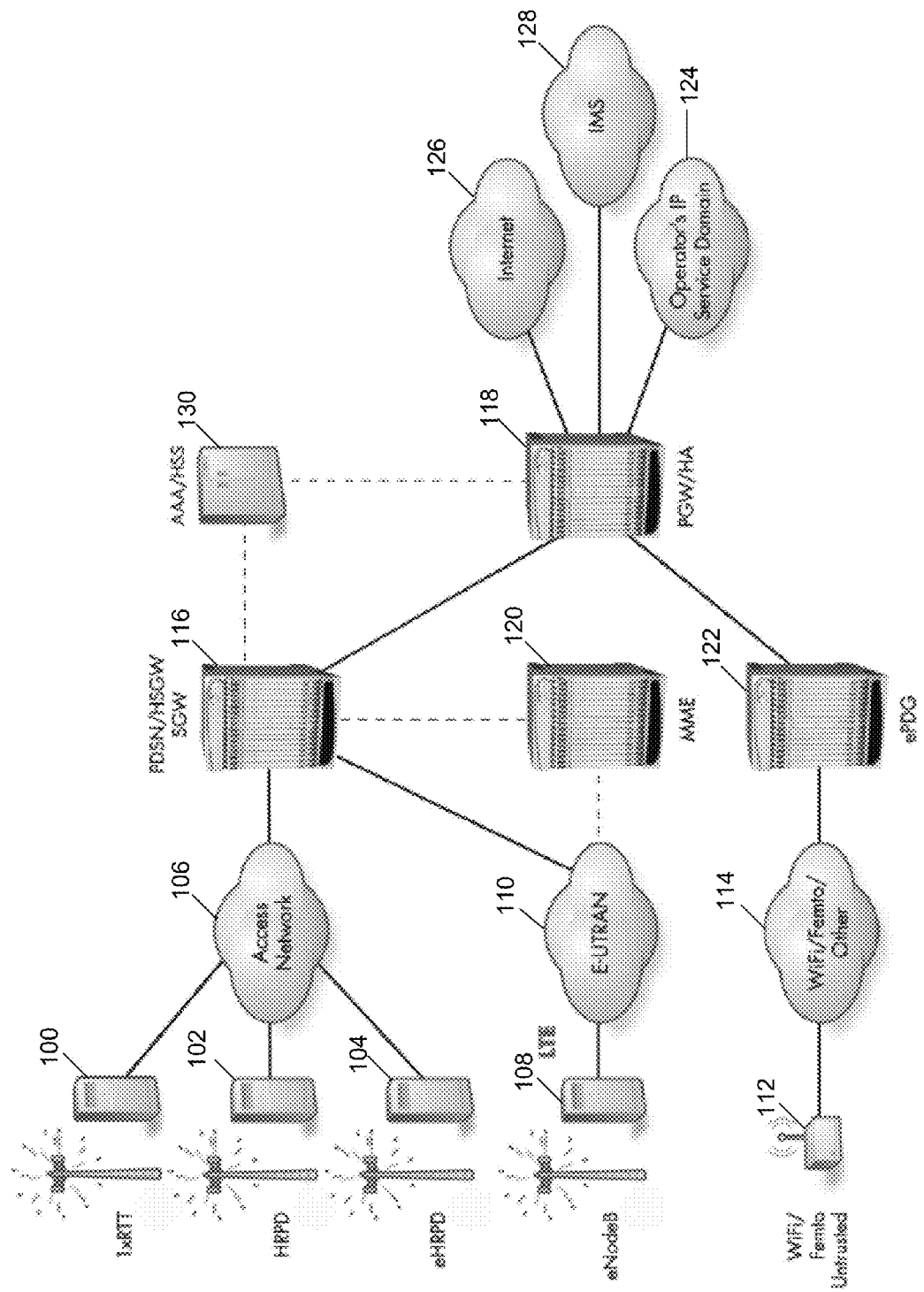
FIGS. 1-3 illustrate communication networks including a long term evolution (LTE) topology in accordance with some embodiments.

Certain embodiments disclose a gateway and method including a session manager for receiving, on a network connection of a gateway, data from a server that is directed to a mobile device over a mobile network, wherein the data is received in accordance with a transmission control protocol (TCP) that has one or more TCP congestion control parameters that manage congestion control behavior between the server and the mobile device; receiving, at a session manager of the gateway, one or more quality of service (QoS) mobile system parameters related to the QoS of the mobile network provided to the mobile device; and managing the transmission of the data between the server and the mobile device by modifying the one or more TCP congestion control parameters based on the received one or more QoS mobile system parameters.

Example Embodiments

Internet applications and services use a set of specific network protocols to communicate data. These protocols operate at different "layers" in a network architecture. Each layer provides services to the layer above, while receiving services from the layer below. For example, protocols operating in the link layer enable data transfer among devices connected on the same network. The network layer operates above the link layer. Protocols operating in the network layer enable data transfer among devices on different networks, by building on the services, features, and functionality provided by the link layer. Similarly, the transport layer operates above the network layer. Transport layer protocols address the reliability of a given network link through services or features such as flow control, segmentation and desegmentation, and error control, by building on the services and features provided by the network layer.

As one example of network communication, a user at a personal computer might view a web site using a web browser. The web browser connects over a network such as the Internet to a remote server, to request instructions for displaying the web site. The server sends these instructions and the web browser receives these instructions according to specific protocols. These protocols specify how data should be transferred from a sender to a receiver. Using these protocols, the sender and receiver know how to send and receive data in a common format that can be understood by both sides. Similarly, Internet applications such as email and file transfers transfer instructions and data from a sender to a receiver using a specified set of network protocols.

Transmission Control Protocol (TCP) is one example of a protocol used by senders and receivers on the Internet. Wired networks such as the Internet are comprised of many networks. TCP was initially designed and specified for wired networks where network performance characteristics such as available bandwidth and capacity can fluctuate. Each of these many networks typically has different performance characteristics based on a variety of factors, such as the equipment used and congestion present on the network. These performance characteristics can also depend on how many other senders and receivers are sending data over the same network. If the network is idle, the user's bandwidth may be faster. If the network is active, each user's bandwidth may be slower because the network is congested with data. As such, the transmission speed of data varies based on the rates provided by the networks traversed as the data moves from sender to receiver.

If wired networks become congested with data, underlying network protocols in lower layers specify that the network infrastructure may drop or lose data packets, causing the packets not to be delivered to the receiver as intended. The design of TCP is to detect dropped or lost packets, and adjust dynamically by lowering the allowable rate at which senders may send packets. The assumption made by the designers of TCP is that undelivered packets are due to network congestion, and lowering the rate at which senders may send packets helps to alleviate congestion on the network.

To adapt dynamically to undelivered data packets, TCP defines congestion control algorithms. Congestion control algorithms and relevant parameters in TCP restrain performance of TCP connections under an assumption that if individual senders send packets at a slower rate, overall network congestion will improve. Network application programs can modify input parameters into these congestion control algorithms. These modifications can improve TCP performance by providing hints about known or guaranteed network performance characteristics.

As described above, TCP has been optimized for wired networks. The design of TCP considers packet loss to be the result of network congestion. However, mobile wireless networks are unpredictable. For example, the locations of mobile devices are constantly changing as mobile subscribers travel from one location to another. Wireless signals can be affected due to weather, buildings, or fade outs. Mobile devices experience sporadic and usually temporary losses due to fading, shadowing, hand off, and other radio effects on mobile wireless networks. Each of these effects can result in lost packets on the network, and yet the lost packets are due to reasons other than network congestion. The design of TCP nonetheless specifies that performance should be throttled, based on the incorrect assumption that the network is experiencing congestion, when in actuality the reason might be due to factors related to the mobile nature of the device.

Furthermore, the design of TCP is to throttle performance with the goal of adjusting sending and receiving rates, to arrive at an approximate rate that is not too fast and not too slow for the network. The goal of this throttling design for TCP is to make substantially optimal use of the network. However, mobile gateways already have relevant information about network performance characteristics available to a mobile subscriber. For example, some cellular plans allow users to pay for a guaranteed amount of bandwidth per month. In the mobile network, Quality of Service (QoS) parameters describe a mobile subscriber's guaranteed bandwidth and capacity as values that can be stored, modified, and communicated to other devices on the network. Ideally, the management of network protocol congestion control parameters should incorporate mobile system information.

Turning now to the figures, FIG. 1 illustrates a communication network that includes congestion control modification in accordance with certain embodiments. FIG. 1 includes a number of radio access technologies such as a 1xRTT transceiver 100, a high-rate packet data (HRPD) transceiver 102, and an evolved high-rate packet data (eH-RPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network.

The access network 106 can communicate with an access gateway 116. The access gateway 116 implements one or more of the following functionalities, such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118 (which can implement a packet data network gateway (PGW) and a Home Agent (HA)) and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state user equipment (UEs), the SGW terminates the down link data path and triggers paging when down link data arrives for the UE. The UE can include a mobile phone, a laptop with wireless connectivity, a netbook, a smartphone, or any other wireless device. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or Session-Initiation-Protocol-based (SIP-based) IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1x and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
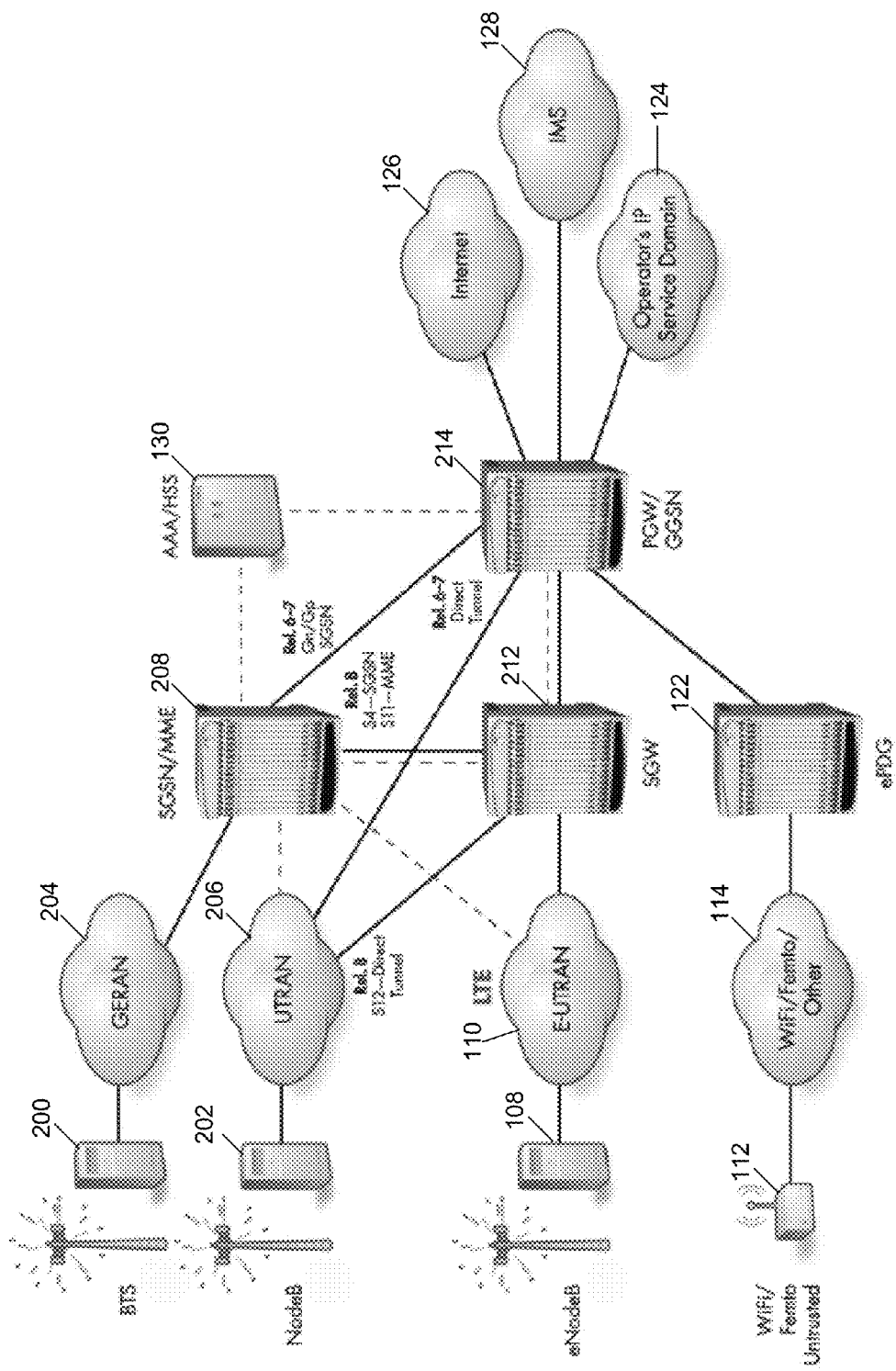

FIG. 2 illustrates a communication network that implements congestion control modification with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the congestion control modification can be implemented on a gateway, such as PGW/GGSN 214. The gateway 214 can access and maintain mobile system information relating to the communication session, the subscriber, the bearers, and the policies relating to the communication session. The gateway 214 may be used to provide various services to a mobile device and implement the quality of service (QoS) on packet flows. Several of these functions are used in providing, for example, voice over IP (VoIP) routing and enhanced services, such as enhanced charging, stateful firewalls, and traffic performance optimization (TPO). The communication networks also allow provision of applications such as VoIP, streaming video, streaming music, multi-user gaming, location based services, and a variety of content delivered to a mobile node. Residing within the gateway can be one or more network processing units, line cards, as well as packet and voice processing cards.

Figure 3:
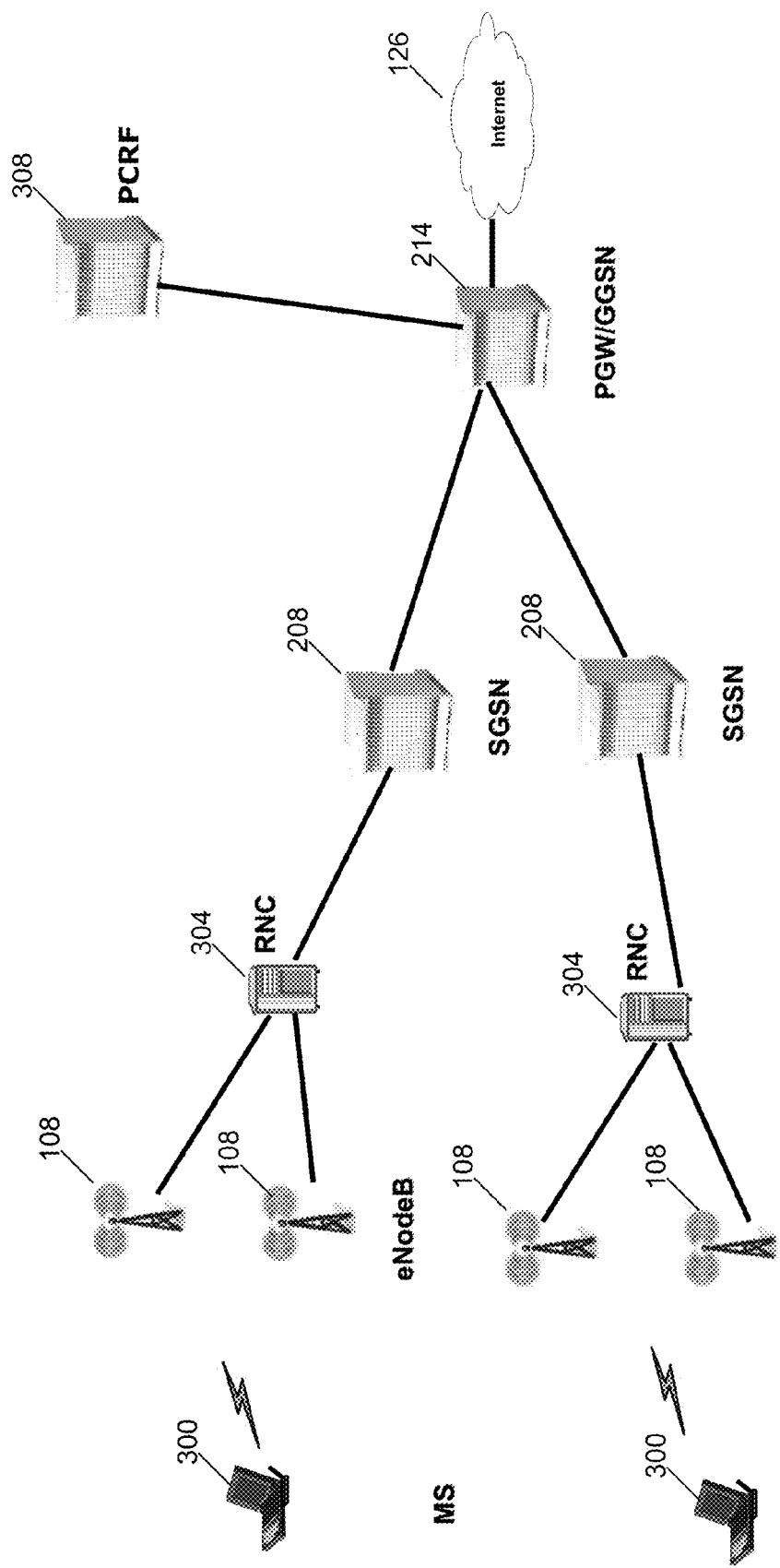

The congestion control modification can be implemented as shown in FIG. 3. FIG. 3 illustrates a communication network that implements congestion control modification with legacy UMTS network devices in accordance with certain embodiments. FIG. 3 includes mobile stations (MS) 300, eNodeB transceivers 108, Radio Network Controller (RNC) 302, serving GPRS support node (SGSN) 208, PDN gateway (PGW)/gateway GPRS support node (GGSN) 214 in communication with the Internet 126, and policy charging and rules function (PCRF) 308. The eNodeB 108 can communicate with a Radio Network Controller 304. The serving GPRS support node (SGSN) can be implemented on a gateway 208 with a mobility management entity (MME). The RNC 304 can communicate through the SGSN functionality on gateway 208 to PDN gateway (PGW)/gateway GPRS support node (GGSN) 214.

As described above, the PGW 214 provides connectivity between a MS 300 to external packet data networks such as the Internet 126. For example, if a user on MS 300 visits a web site using a web browser, a request is sent over eNodeB 108, through RNC 304, SGSN 208, and PGW/GGSN 214 to a remote web server which is hosting the web site in communication with the Internet 126. In network terminology, the remote web server is the sender, and MS 300 is the receiver. As described earlier, this communication between senders and receivers happens over the Internet using network protocols.

Transmission Control Protocol (TCP) is an example of a network protocol operating in the transport layer that allows packets of data to be sent reliably between a sender and a receiver over the Internet 126. As a protocol operating in the transport layer of the networking model, TCP can provide reliable and sequential delivery of packets from the sender to the receiver. TCP can further provide that packets are delivered at most once to the receiver. Packets are also referred to as segments or Protocol Data Units (PDUs).

Transport layer protocols such as TCP address errors inherent in network systems by requesting retransmission of lost packets, rearranging out-of-order packets, and minimizing network congestion. TCP is optimized for ensuring that packets are sent to a receiver from a sender in a manner that allows the receiver to reconstruct the data sent by the sender. One manner in which the design of TCP attempts to ensure accurate delivery is by specifying adjustments to the rate of sending and receiving packets, referred to as a sliding window flow control protocol. TCP is designed to dynamically adjust the packet volume sent and received over the network, to avoid overwhelming the network and thereby cause packets to be dropped or lost. The term window size refers to the packet volume allowed to be sent or received. TCP supports various window sizes in which the windows act as buffers to indicate the number of additional packets or bytes that can be sent or received before awaiting an acknowledgement from the receiver or sender.

Windows used by TCP include a congestion window and a receiver window. The congestion window is a state variable that limits the amount of data that a sender may send, to avoid overwhelming the capacity of the sender to process data or the capacity of the network to carry data. Similarly, the receiver window is a state variable that advertises the amount of additional data that a receiver is willing or able to buffer. To address network congestion, TCP defines a number of mechanisms to control the rate of data sent over the network. Congestion control includes two phases: slow start and congestion avoidance. In the slow start phase, TCP attempts to discover the proper value for the congestion window, to infer the amount of bandwidth available for a TCP connection. As packets are sent and received, the slow start phase increases the size of the congestion window by the number of packets acknowledged by the receiver. Although this phase is known as "slow start," the TCP standard describes this phase as actually quite aggressive, more so than the congestion avoidance phase, described below.

Figure 4:
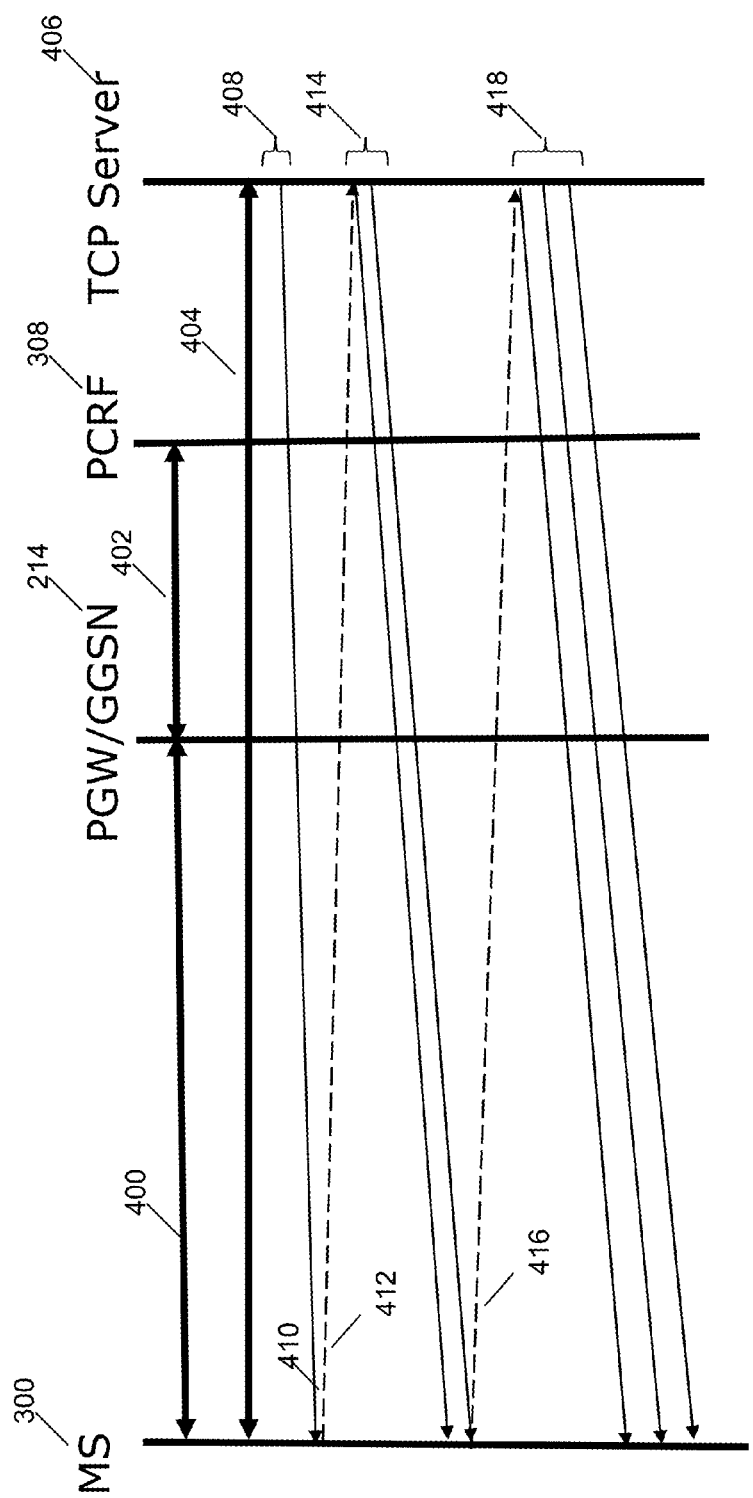
FIG. 4 illustrates a signal flow for communicating between a remote server and a mobile device in accordance with certain embodiments.

FIG. 4 illustrates a signal flow of the congestion avoidance phase in accordance with certain embodiments. In the congestion avoidance phase, TCP constantly refines its internal estimate of the available bandwidth, to avoid overwhelming the network with data. The MS 300 establishes a session 400 with the PGW/GGSN 214. The PCRF 308 delivers mobile subscriber information in communication 402 to the PGW/GGSN 214. The MS 300 establishes a TCP connection 404 with a remote TCP server 406 over the Internet 126. The server 406 sets the size of the congestion window 408 to a small value, to avoid overwhelming the network. In an example embodiment, the initial size of the congestion window 408 is set to IW=1. This means that the sender, server 406, sends one packet 410 to the receiver, MS 300, before awaiting an acknowledgement 412. According to congestion avoidance, TCP specifies that the server 406 adjusts the size of the congestion window using a principle known as additive increase, multiplicative decrease.

In the additive increase phase, after each acknowledgement, the sender increases the congestion window size linearly, by one packet. Therefore, after the server 406 has received an acknowledgement 412, the server 406 increases the size of the congestion window 414 (cwnd) from cwnd=1 to cwnd=2. When the server 406 receives acknowledgement 416 that MS 300 received both packets, the server 406 increases the size of the congestion window 418 from cwnd=2 to cwnd=3. In mobile wireless networks, acknowledgements 412, 416 can take longer to arrive at the server 406 than in wired networks. This is because the acknowledgements 412, 416 may be sent partially over a wireless air interface that is typically slower than wired networks. As described earlier, the wireless medium is unpredictable. Therefore, the performance of the TCP connection 404 can be slow initially as the server 406 continually waits for acknowledgements from the MS 300 before the server 406 can increase the size of the congestion window to provide better bandwidth and performance to the MS 300.

In the multiplicative decrease phase, TCP specifies that if the server 406 infers that packets are being lost, it decreases the congestion window size by half. Therefore, after the server 406 sends three packets, if the server 406 does not receive an acknowledgement from MS 300, the server 406 decreases the size of the congestion window by half. Because the size of the congestion window 418 was cwnd=3, the new size would be cwnd=1.5 which the server 406 would round up or down accordingly to an integer value. The result of these phases exhibits a sawtooth pattern conceptually, as the size of the congestion window increases slowly, and then suddenly decreases by half. This sawtooth behavior repeats for the duration of the TCP connection.

TCP defines a number of parameters that can be modified to affect the performance of congestion control algorithms. Such parameters include initial window size for the sender's congestion window, slow start threshold, and restart window size. The initial window size (IW) determines the starting size of the sender's congestion window. In the TCP standard, the initial window size may be set between 2-4 packets, based on the maximum segment size (MSS) setting. The slow start threshold (ssthresh) is used to determine whether the slow start algorithm or congestion avoidance algorithm is used to control data transmission. The initial value of the slow start threshold may be set to an arbitrarily high value at the beginning of connection. The purpose of setting a high value for slow start threshold is to allow the network conditions, rather than an arbitrary host limit, to dictate the sending rate. The sender can then refine the slow start threshold value based on network conditions such as congestion. Lastly, the restart window can be used to configure the size of the congestion window if the sender restarts transmission after an idle period.

As described earlier, TCP has been optimized for wired networks. Packet loss is considered to be the result of network congestion, and the congestion window size can be reduced dramatically as a precaution. However, mobile wireless links can experience sporadic and usually temporary losses due to fading, shadowing, hand off, and other radio effects, that are due to reasons other than network congestion. After the erroneous back-off of the congestion window size due to packet loss from the mobile network, communication between a remote server on the Internet and the mobile device can experience a congestion avoidance phase with corresponding conservative decrease in window size. This can cause the mobile wireless network to be underutilized. One way to address this underutilization is to make use of mobile subscriber information. In the mobile wireless network, mobile subscriber information may be provided by, for example, the PDN gateway (PGW) 118 for LTE networks, the gateway GPRS support node (GGSN) 214 for legacy UMTS or GPRS networks, or a session manager running on a network device.

In mobile networks, bearers carry voice and packet data between the mobile network and the mobile subscriber's mobile device, referred to as the user equipment (UE). In the PGW 118, for LTE networks when the UE connects to a packet data network (PDN) such as the Internet 126, one Evolved Packet System (EPS) bearer is established, and this bearer remains established throughout the lifetime of the PDN connection to provide the UE with always-on Internet Protocol connectivity to that PDN. This bearer is referred to as the default bearer. A dedicated bearer can either be a Guaranteed Bit Rate (GBR) or a non-GBR bearer. Any additional EPS bearer established for the same PDN connection is referred to as a dedicated bearer. A default bearer is a non-GBR bearer. The distinction between default and dedicated bearers is transparent to the access network (e.g., the E-UTRAN 110). An EPS bearer is referred to as a GBR bearer if dedicated network resources related to a GBR value associated with the EPS bearer are permanently allocated (e.g., by an admission control function in the eNodeB 108)

at the time of bearer establishment or modification. Otherwise, an EPS bearer is referred to as a non-GBR bearer.

As described earlier, Quality of Service (QoS) parameters measure the quality of the mobile subscriber's network connection. Two QoS parameters are QoS Class Identifier (QCI) and Allocation and Retention Policy (ARP). When a mobile subscriber is using the Internet on a mobile device, the QoS parameters describe the quality to be provided by the network connection between the UE and a remote server on the PDN. Each EPS bearer, GBR and non-GBR, is associated with the bearer-level QoS parameters QCI and ARP. QCI is used as a reference to access node-specific parameters that control bearer-level packet forwarding treatment (e.g., scheduling weights, admission thresholds, queue management thresholds, link layer protocol configuration, etc.). ARP is used to decide whether a bearer establishment or modification request can be accepted or rejected due to resource limitations. ARP contains information about the priority level, the pre-emption capability and the pre-emption vulnerability. The priority level information of the ARP is used for this decision to ensure that a request by a bearer with a higher priority level is preferred. In addition, ARP can be used (e.g., by the eNodeB 108) to decide which bearers to drop during exceptional resource limitations (e.g., at handover). The preemption capability information of the ARP defines whether a bearer with lower ARP priority level should be dropped to free up the limited resources. The pre-emption vulnerability information of the ARP defines whether a bearer is applicable for such dropping by a pre-emption capable bearer with a higher ARP priority value. Once successfully established, a bearer's ARP does not further influence bearer-level packet forwarding treatment (e.g., scheduling and rate control). Such packet forwarding treatment can be determined instead by the other EPS bearer QoS parameters: QCI, GBR and MBR, and by the AMBR parameters.

Two additional QoS parameters are Guaranteed Bit Rate (GBR) and Maximum Bit Rate (MBR), which are bearer-level QoS parameters associated with each GBR bearer. GBR denotes the bit rate that can be expected to be provided by a GBR bearer. MBR limits the bit rate that can be expected to be provided by a GBR bearer. MBR is used to enforce the maximum bit rate that the Service Data Flow (SDF) may consume, while GBR is used by the policy and charging equipment function (PCEF) to determine resource reservation or allocation.

Another QoS parameter is per APN Aggregate Maximum Bit Rate (APN-AMBR), which is associated with each Access Point Name (APN) access by a UE. APN-AMBR is a subscription parameter stored per APN in the home subscriber server (HSS) 130. APN-AMBR limits the aggregate bit rate that can be expected to be provided across all non-GBR bearers and across all PDN connections of the same APN (e.g., excess traffic may get discarded by a rate shaping function). Each non-GBR bearer could potentially utilize the entire APN-AMBR, e.g., when the other non-GBR bearers are not carrying any traffic. GBR bearers are outside the scope of APN-AMBR. The PGW 118 enforces the APN-AMBR in downlink. Enforcement of APN-AMBR in uplink is done in the UE and additionally in the PGW 118.

Another QoS parameter is UE Aggregate Maximum Bit Rate (UE-AMBR), which is associated with each UE. UE-AMBR measures aggregate maximum bit rate across all bearers associated with a UE. UE-AMBR is limited by a subscription parameter stored in the HSS 130. The mobility management entity (MME) 120 sets UE-AMBR to the sum of the APN-AMBR of all active APNs, up to the value of the subscribed UE-AMBR. UE-AMBR limits the aggregate bit rate that can be expected to be provided across all non-GBR bearers of a UE. This means that data traffic sent at a rate in excess of the UE-AMBR value may get discarded by a rate shaping function. Each non-GBR bearer could potentially utilize the entire UE-AMBR, e.g., when the other non-GBR bearers are not carrying any traffic. GBR bearers are outside the scope of UE-AMBR. The E-UTRAN enforces the UE-AMBR in uplink and downlink. The GBR and MBR denote bit rates of traffic per bearer, while UE-AMBR and APN-AMBR denote bit rates of traffic per group of bearers. Each of those QoS parameters has an uplink and a downlink component.

The following table illustrates network applications in accordance with certain embodiments.

Standardized QCI Characteristics

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) |
| 9 | | 9 | | | TCP-based (e.g., www, e-mail, chat, ftp, p2p file sharing, progressive video, etc.) |

As shown in the table above, a mobile subscriber has available different example network applications or services based on the Quality of Service provided by the mobile network. For example, for a mobile subscriber to have a call with another party, the Conversational Voice service tolerates a Packet Delay Budget (PDB) of 100 milliseconds and Packet Error Loss Rate (PELR) of $10^{-2}$ over a Guaranteed Bit Rate bearer. If the QoS values drop below these parameters, the mobile subscriber may experience bursts of static or silence when the packets cannot be sent or received. A mobile subscriber having a live video chat with another person, however, may have different QoS usage patterns. The Conversational Video (Live Streaming) service allows a higher PDB of 150 milliseconds, but tolerates a lower PELR of $10^{-3}$ over a Guaranteed Bit Rate Bearer. A mobile subscriber streaming a movie or checking email over the Internet might tolerate a relatively longer PDB of 300 milliseconds, but tolerate far fewer errors with PELR of $10^{-6}$ using a non-GBR bearer.

As shown in the above table, two other QoS parameters are Packet Delay Budget (PDB) and Packet Error Loss Rate (PELR), which are measures of the QoS Class Identifier (QCI). PDB defines an upper bound for the time that a packet may be delayed between the UE and the PCEF. The purpose of PDB is to support configuration of scheduling and link layer functions (e.g., setting of scheduling priority weights and hybrid automatic repeat request (HARQ) target operating points). The PDB is interpreted as a maximum delay with a confidence level of 98%. For certain QCI, the value of PDB is the same in uplink and downlink. PELR defines an upper bound for a rate of non-congestion-related packet losses. Specifically, PELR defines an upper bound for the rate of SDUs (service data units) (e.g., IP (Internet Protocol) packets) that have been processed by the sender of a link layer protocol (e.g., RLC (Radio Link Control) protocol in the E-UTRAN 110) but that are not successfully delivered by the corresponding receiver to the upper layer (e.g., PDCP (Packet Data Convergence Protocol) in the E-UTRAN 110). The purpose of PELR is to allow for appropriate link layer protocol configurations (e.g., RLC and HARQ in the E-UTRAN 110). For a given QCI, the value of PELR may be the same in uplink and downlink.

Bearer services using a non-GBR QCI are generally prepared to experience congestion-related packet drops, and 98% of packets that have not been dropped due to congestion do not generally experience a delay exceeding the QCI's PDB. For example, this delay may occur during traffic load peaks or when the UE becomes coverage-limited. On the other hand, services using a GBR QCI and sending at a rate below the GBR can generally assume that congestion-related packet drops will not occur, and 98% of the packets will not experience a delay exceeding the QCI's PDB. However, exceptions (e.g., transient link outages) can occur in a radio access system, which may then lead to congestion-related packet drops even for services staying within the QoS parameters, such as services using a GBR QCI and sending at a rate smaller than or equal to GBR.

Another aspect of QoS parameters is policy control and charging (PCC) rules. In some embodiments, mobile wireless networks support PCC rules as ways to implement QoS provisions. The purpose of a PCC rule is to detect a packet belonging to a service data flow (SDF), identify a bearer service to which an SDF contributes, provide applicable charging parameters for an SDF, and provide policy control for a SDF. When detecting a packet belonging to an SDF, the service data flow filters within the PCC rule are used for selection of downlink IP-CAN bearers, and the service data flow filters within the PCC rule are used for enforcement that uplink IP flows are transported in the correct IP CAN bearer. The policy and charging enforcement function (PCEF) generally selects a PCC rule for each received packet by evaluating received packets against service data flow filters of PCC rules in order of precedence of the PCC rules. When a packet matches a service data flow filter, the packet matching process for that packet is completed, and the PCC rule for that filter is applied. There are two different types of PCC rules, (1) dynamic PCC rules and (2) predefined PCC rules. Dynamic PCC rules are dynamically provisioned by the policy control and charging rules function (PCRF) 308 to the PCEF via the Gx interface. These PCC rules may be either predefined or generated dynamically in the PCRF 308. Dynamic PCC rules can be installed, modified and removed at any time. Predefined PCC rules are preconfigured in the PCEF. Predefined PCC rules can be activated or deactivated by the PCRF 308 at any time. Predefined PCC rules within the PCEF may be grouped, allowing the PCRF 308 to dynamically activate a set of PCC rules over the Gx reference point.

A PCC rule may consist of a rule name, service identifier, service data flow filters, precedence, gate status, QoS information, charging key (i.e. rating group), other charging parameters, and monitoring key. The service data flow filters are used to select the traffic for which the rule applies. SDF filters generally support wildcards, both for dynamic and predefined PCC rules. For different PCC rules with overlapping service data flow filters, the precedence of the rule determines which of the rules is applicable. When a dynamic PCC rule and a predefined PCC rule have the same precedence, the dynamic PCC rule takes precedence. Gate status indicates whether the service data flow, detected by the service data flow filters, may pass (if the gate is open) or be discarded (if the gate is closed) in the uplink and/or downlink direction. QoS information include the QoS class identifier (authorized QoS class for the service data flow), the Allocation and Retention Priority (ARP) and authorized bitrates for uplink and downlink.

The PCEF may also enforce policy for an authorized QoS per individual service data flow. If an authorized QoS is defined for a PCC rule, the PCEF limits the data rate of the service data flow corresponding to that PCC rule not to exceed the maximum authorized bandwidth for the PCC rule, by discarding packets exceeding the limit. The PCEF generally reserves the resources for the guaranteed bitrate for the PCC rule upon receipt of a PCC rule provisioning including QoS information. For GBR bearers, the PCEF sets the bearer's GBR to the sum of the GBRs of all PCC rules that are active or installed and bound to that GBR bearer. The PCEF also sets the bearer's MBR to the sum of the MBRs of all PCC rules that are active or installed and bound to that GBR bearer.

Another QoS parameter is authorized Aggregate Maximum Bit Rate per Access Point Name (authorized APN-AMBR). In some embodiments, the mobile wireless network enforces policy for an authorized QoS per Access Point Name (APN). Specifically, the PCEF enforces the APN-AMBR. The PCEF may receive an authorized QoS per APN at Internet Protocol Connectivity Access Network (IP-CAN) session establishment and also at IP-CAN session modification. Authorized APN-AMBR sets an upper limit for the bandwidth usage for all non-GBR bearers for that APN. The PCEF generally limits to that value the aggregated traffic of all SDFs of the same APN that are associated with non-GBR QCIs. Upon every interaction with the PDN GW 214 (shown in FIGS. 2, 3), the PCRF 308 (shown in FIG. 3) may provide the Authorized APN-AMBR. In such a case, the Authorized APN-AMBR overrides any possible APN-AMBR stored in the PCEF. In the case of aggregation of multiple service data flows, the combination of the authorized QoS information of the individual service data flows is provided as the authorized QoS for this aggregate.

The enforcement of the authorized QoS of the IP-CAN bearer may lead to downgrading or upgrading of the requested bearer QoS by the GW (PCEF) as part of a UE-initiated IP-CAN bearer establishment or modification. Alternatively, the enforcement of the authorized QoS may lead to network initiated IP-CAN bearer establishment or modification, depending on operator policy and network capabilities. If the PCRF 308 provides authorized QoS for both the IP-CAN bearer and PCC rules, the enforcement of authorized QoS of the individual PCC rules takes place first.

QoS authorization information may be dynamically provisioned by the PCRF 308 or it may be a pre-defined PCC rule in the PCEF. If the PCRF 308 provides PCC rules dynamically, authorized QoS information for the IP-CAN bearer (combined QoS) may be provided. For predefined PCC rules within the PCEF, the authorized QoS information generally takes effect when the PCC rule is activated. The PCEF combines the different sets of authorized QoS information, i.e., the information received from the PCRF 308 and the information corresponding to the predefined PCC rules. The PCRF generally knows the authorized QoS information of the predefined PCC rules and takes this information into account when activating the rules. This ensures that the combined authorized QoS of a set of PCC rules that are activated by the PCRF is within the limitations given by the subscription and operator policies, regardless of whether these PCC rules are dynamically provided, predefined, or both.

In some embodiments, the mobile wireless network supports service data flow (SDF) prioritization and conflict handling. Service pre-emption priority enables the PCRF to resolve conflicts where the activation of all requested active PCC rules for services would result in a cumulative authorized QoS which exceeds the Subscribed Guaranteed bandwidth QoS. For example, when supporting network-controlled QoS, the PCRF 308 may use the pre-emption priority of a service, the activation of which would cause the subscriber's authorized QoS to be exceeded. If this pre-emption priority is greater than that of any one or more active PCC rules, the PCRF 308 can determine whether the deactivation of any one or more such rules would allow the higher pre-emption priority PCC rule to be activated whilst ensuring the resulting cumulative QoS does not exceed a mobile subscriber's Subscribed Guaranteed Bandwidth QoS. If such a determination can be made, the PCRF 308 may resolve the conflict by deactivating selected PCC rules with lower pre-emption priorities and accepting the higher priority service information from the AF. If such a determination cannot be made, the PCRF may reject the service information from the AF.

In addition to QoS parameters in LTE networks, in some embodiments, the GGSN may enforce QoS. In the GGSN, QoS details may change for a legacy UMTS network compared to an LTE network. Changes in QoS details for a UMTS network compared to an LTE network may include policy enforcement for authorized QoS per IP-CAN bearer, policy enforcement for authorized QoS of the default Evolved Packet System (EPS) Bearer, GW (PCEF)-initiated IP-CAN session modification, and PCRF-initiated IP-CAN session modification. In policy enforcement for authorized QoS per IP-CAN bearer, the PCEF enforces the policy based authorization, i.e., to ensure that the requested QoS is in-line with the "authorized QoS" per IP-CAN bearer. In policy enforcement for authorized QoS of the default EPS bearer, the PCEF may receive the authorized QoS for the default bearer over the Gx interface. The PCEF enforces the authorized QoS which may lead to the upgrade or downgrade of the subscribed default EPS bearer QoS. In GW (PCEF) initiated IP-CAN session modification, for IP-CAN session modification, the PCEF includes modification of 3GPP specific information. Additionally, the PCRF 308 may provide the parameters authorized APN-AMBR and authorized default EPS bearer QoS in the acknowledgement of the IP-CAN session modification to the PDN GW 118, 214 (shown in FIGS. 1, 2). In PCRF-initiated IP-CAN session modification, the PCRF 308 (shown in FIG. 3) may provide the parameters of authorized APN-AMBR and authorized default EPS bearer QoS in the Policy and Charging Rule Provision to the PDN GW 118, 214, in addition to the parameters for GW (PCEF) initiated modification.

In some embodiments, QoS details in the GGSN also change for a legacy GPRS network compared to an LTE network. Changes in QoS details for a GPRS network compared to an LTE network may include policy enforcement for authorized QoS per QoS Class Identifier (QCI), coordination of authorized QoS scopes in mixed mode by the GPRS, GW (PCEF) initiated IP CAN session modification, and PCRF initiated IP-CAN session modification. In policy enforcement for authorized QoS per QCI, the PCEF can receive an authorized QoS per QCI for non GBR-bearer QCI values for those IP-CAN types that support non-GBR bearers that have a separate Maximum Bit Rate (MBR) (i.e. 3GPP-GPRS). Authorized QoS per QCI sets an upper limit for the MBR that the PCEF may assign to a non-GBR bearer with that QCI. If the PCEF receives an authorized QoS per QCI for a non-GBR bearer QCI value, it generally does not set a higher MBR for that bearer than the provisioned MBR. The PCEF assigns the authorized MBR per QCI to a non-GBR bearer with that QCI to avoid frequent IP-CAN bearer modifications, as PCC rules can be dynamically activated and deactivated. If multiple IP-CAN bearers within the same IP-CAN session are assigned the same QCI, authorized MBR per QCI applies independently to each of those IP-CAN bearers. In coordination of authorized QoS scopes in mixed mode by GPRS, the PCRF 308 authorizes the bandwidth for an IP-CAN bearer which is used for the PCC rules it has bound to the IP-CAN bearer. The PCEF adds to the PCRF-provisioned authorized bandwidth of an IP-CAN bearer the bandwidth of all policy control and charging (PCC) rules it has bound to that IP-CAN bearer, unless the derived MBR value exceeds a possibly provisioned authorized QoS per QCI for the bearer's QCI. In GW (PCEF) initiated IP-CAN session modification, in the case of an Update PDP Context request, a PDP context in the IP-CAN session is modified. The modification may include modifying the QoS and/or the traffic mapping information. In PCRF-initiated IP-CAN session modification, to modify a PDP context in the IP-CAN session, the GGSN 214 (shown in FIG. 2) sends an Update PDP Context Request message. The modification may include modifying the QoS negotiated, negotiated Evolved ARP, or the CGI/SAI/RAI change reporting.

In some embodiments, a session manager running on a network device (e.g., PGW) may enforce QoS. In the session manager, the following QoS information is generally available: (1) per Policy control and charging (PCC) rules; (2) per bearer (for LTE, GBR bearers; or for UMTS or GPRS, any bearers which implicitly enforce and implement restrictions such as QoS per QCI); and (3) per APN MBR (across all non-GBR bearers). Even though concepts of QoS can vary widely between GPRS, UMTS, LTE networks, QoS information is generally available at the above levels in session manager. A packet may pass through, or skip, each of these gates as appropriate.

Mobile system information, such as the QoS information described above, can provide details about and control over the network bandwidth available to a mobile device. When mobile system information external to TCP is available, senders and receivers can better utilize available network bandwidth by quickly adapting to values known to the mobile network, instead of probing the bandwidth using slow start.

Congestion control modification can occur at various devices in the communication network and a variety of different mechanisms can be used. The goal of these modifications is to improve the network performance experienced by the mobile consumer when accessing Internet data via mobile devices.

Figure 5:
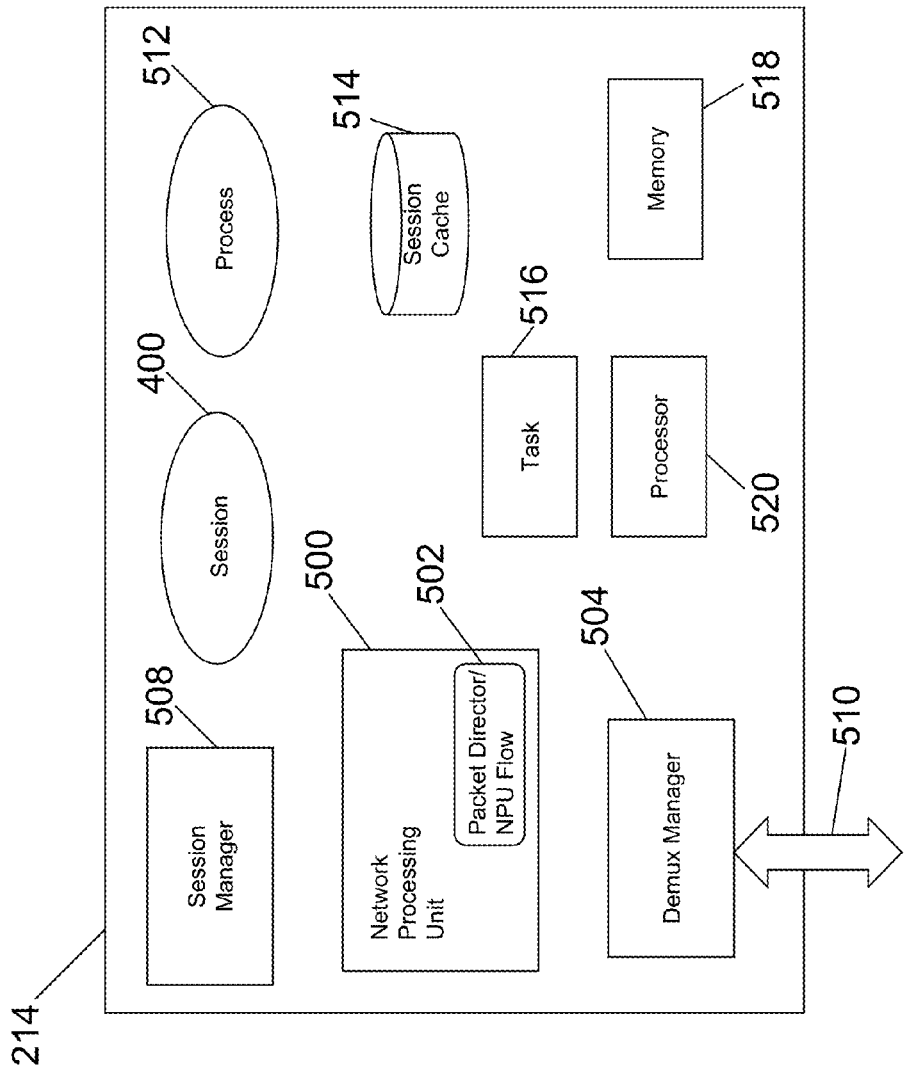
FIG. 5 illustrates a logical view of a network device for congestion control modification in accordance with certain embodiments.

FIG. 5 illustrates a logical view of a gateway that implements congestion control modification in accordance with certain embodiments. As illustrated in FIG. 3, congestion control modification can be provided through a proxy implemented at the PGW/GGSN 214 which is connected to the Internet 126. In FIG. 5, the gateway 214 includes a network processing unit (NPU) 500, a packet director/NPU flow 502, a demux manager 504, sessions 400, a session manager module 508, an input/output interface 510, process 512, session cache 514, tasks 516, memory 518, and processor 520. Interface 510 includes one or more physical connections that can be either wired or wireless to communicate information to and from NPU 500. Session manager module 508 works with interface 510 to provide signals to communicate information from NPU 500 and to receive information from interface 510. In some embodiments, NPU 500 receives electrical or optical signals on interface 510 from the access networks and transmits network information such as data packets and mobile system information to mobile devices. The processor 520 can be one or more integrated circuits that are a multipurpose, programmable, clock-driven, register-based electronic device that accepts binary data as input, processes it according to instructions stored in its memory, and provides results as output. In some embodiments, the processor 520 can be constructed for a specific purpose such as a network processing unit 500 to perform congestion control modification or another specific task.

Memory 518 can be any type of computer readable medium such as random access memory (RAM), programmable read-only memory (PROM), a field programmable gate array (FPGA), flash memory, optical disk drive, or magnetic storage medium. The memory 518 can be used to store computer programs or logic that can be run on processor 520. The memory 518 can also store information such as data structures and other data that is used for providing network protocols and for providing mobile system information such as Quality of Service. The session manager 508 can be hardware or software for performing congestion control modification. The session manager 508 can receive mobile system information on interface 510. In this fashion, the session manager 508 can use mobile system information to modify congestion control parameters in some embodiments.

The processor 520 and memory 518 are used to provide session manager 508, packet director 502, and demux manager 504. For example, session manager 508 and processor 520 can include information stored in memory 518 upon which action is taken by processor 520. In some embodiments, session manager 508 can be implemented as a module that is a combination of hardware and software. Session manager 508 includes data stored in memory 518 such as congestion control parameters and configuration information. Multiple session managers 508 can be used in gateway 214. The session managers 508 can communicate with NPU 210 to modify parameters for congestion control.

When a mobile station (MS) 300 connects to the mobile wireless network through an eNodeB 108, a mobile subscriber session 400 is created between the MS 300 and mobile gateway 214 (shown in FIGS. 3 and 4). In FIG. 5, the session manager 508 manages a plurality of mobile subscriber sessions 400 and may also authenticate the subscriber with a PCRF 308 (shown in FIG. 3) through a mobile subscriber session 400 between the mobile station (MS) 300 (shown in FIG. 3). The result is that the PCRF 308 can use the interface 510 to send policy information and instructions regarding QoS and services to be provided to the subscriber's data to the session manager 508 for use in the mobile subscriber sessions 400. At the conclusion of QoS negotiation, the PGW/GGSN 214 (shown in FIG. 2) has knowledge of the amount of bandwidth reserved for the mobile subscriber session 400.

Figure 6:
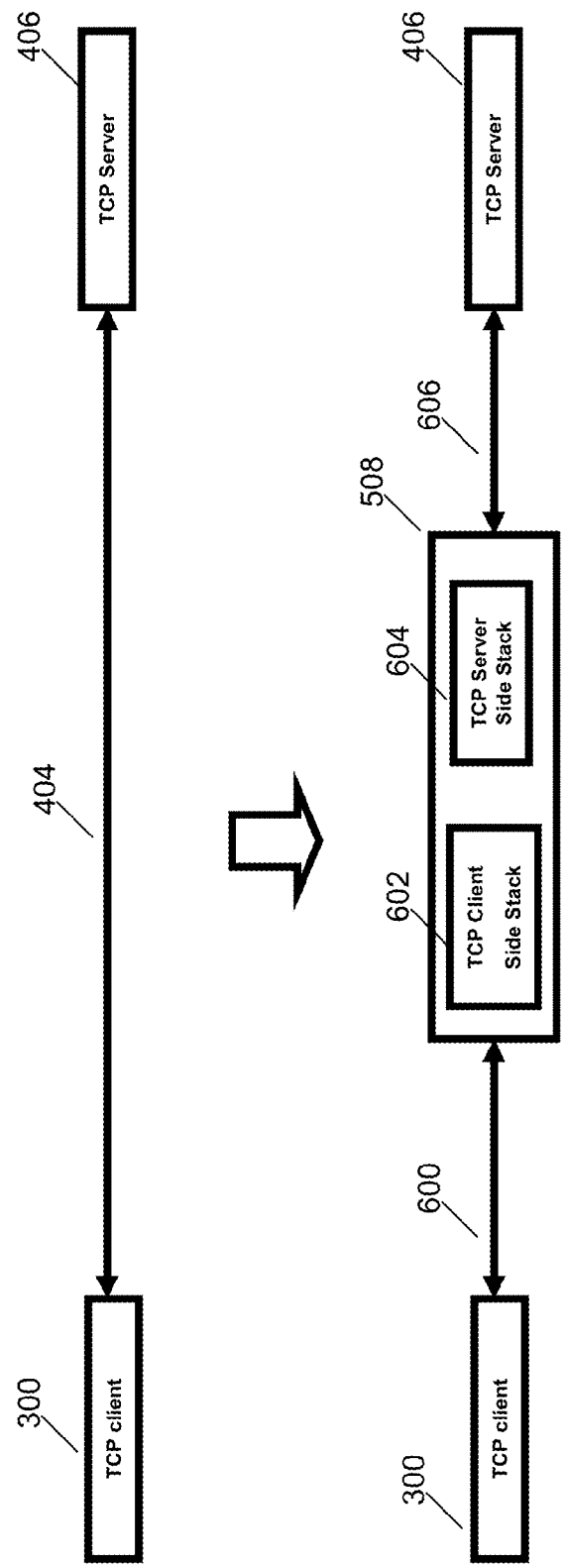
FIGS. 6-7 illustrate a session manager for modifying congestion control in accordance with certain embodiments.

FIG. 6 illustrates the session manager 508 modifying congestion control in accordance with certain embodiments. As described in FIG. 4, a typical TCP connection 404 involves a sender such as TCP server 406 and a receiver such as MS 300. The sender may also be referred to as a TCP server, and the recipient may also be referred to as a TCP client. The TCP proxy implemented in session manager 508 at PGW/GGSN 214 splits TCP connection 404 between the server 406 and the MS 300 into two TCP connections 600, 606. A first TCP connection 600 is established between the PGW/GGSN 214 and the MS 300. A second TCP connection 606 is established between the server 406 and the PGW/GGSN 214. The first TCP connection 600 represents a partially wireless connection between the MS 300 and the PGW/GGSN 214. The second TCP connection 606 represents a wired connection between the PGW/GGSN 214 and the remote server 406. One benefit of implementing a TCP proxy to split a TCP connection is that the TCP standard itself is not modified. Instead, the TCP proxy is transparent to both TCP clients and TCP servers. That is, the MS 300 receives the benefits of congestion control modification without modifying either the TCP client stack on MS 300 or the TCP server on server 406.

Figure 7:
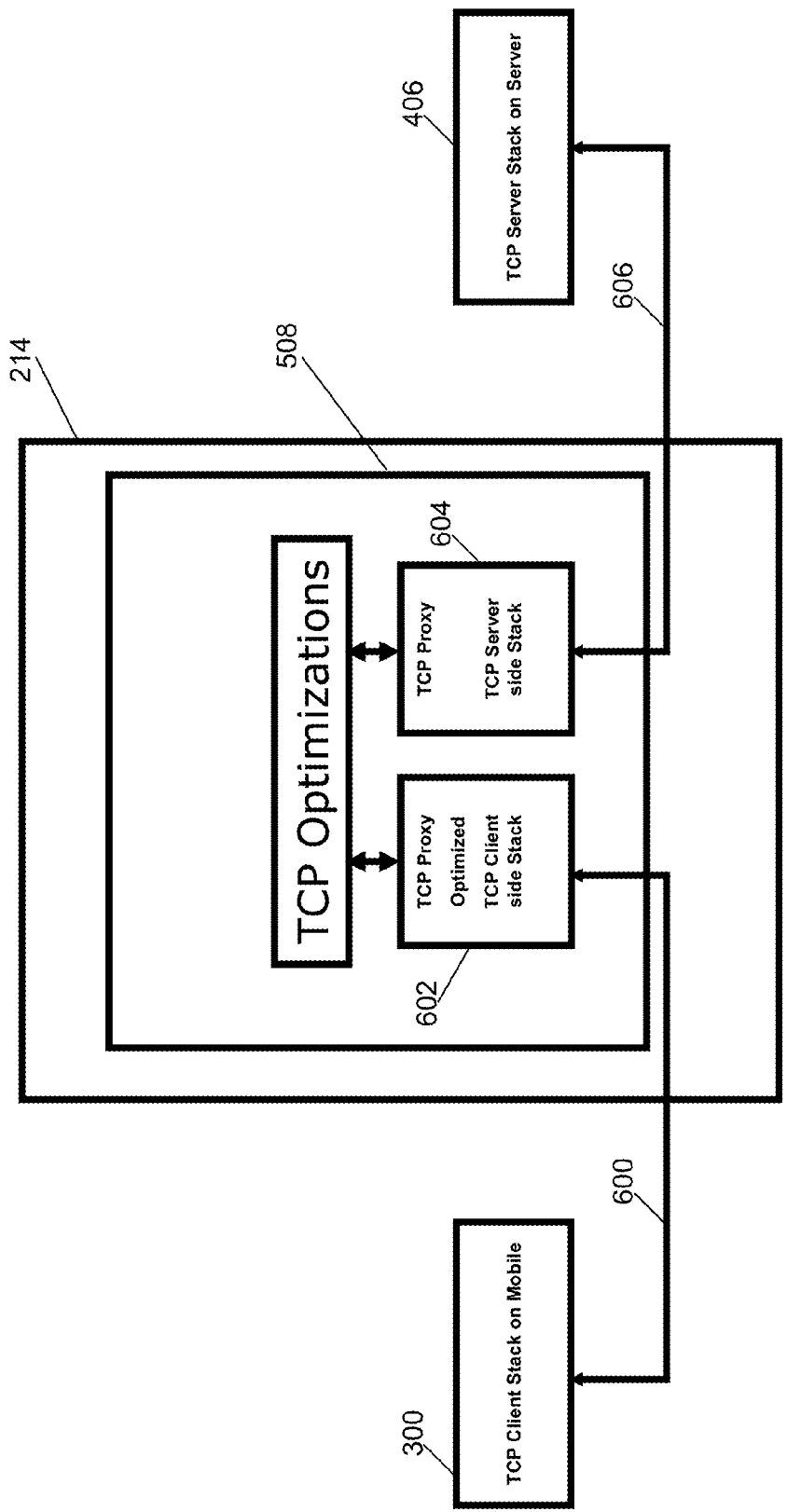

FIG. 7 further illustrates the session manager 508 in accordance with certain embodiments. The TCP proxies are implemented in the session manager 508 in PGW/GGSN 214. The session manager 508 splits a TCP connection between a TCP server 406 and an MS 300 into two TCP connections 600, 606. The first TCP connection 600 is between the client TCP proxy 602 as a sender and the MS 300 as a receiver. The client TCP proxy 602 modifies congestion control parameters for the first TCP connection 600 using the TCP client-side stack and mobile system information as described below. The second TCP connection 606 is between the TCP server 406 as a sender and the TCP proxy 604 as a receiver. The server TCP proxy 604 uses the second TCP connection 606 without optimization, according to the TCP standards.

Figure 8:
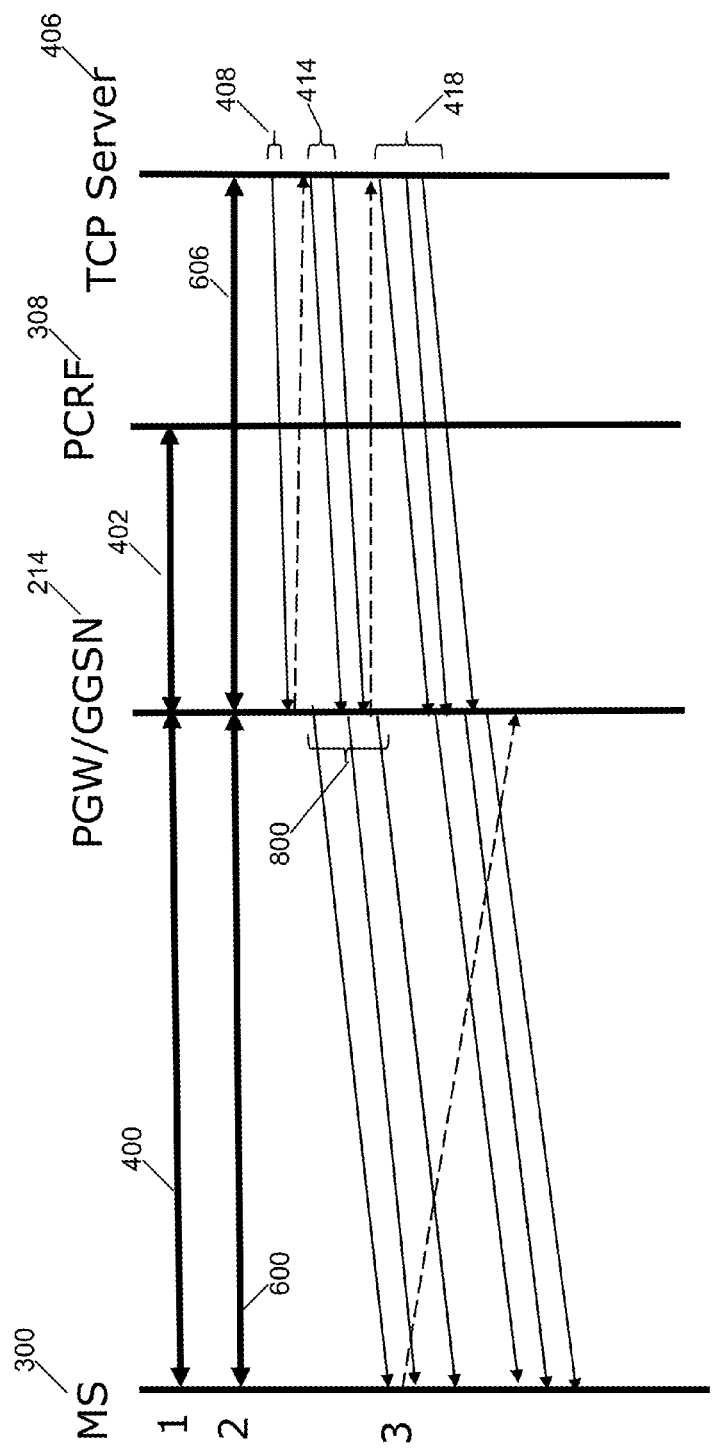
FIG. 8 illustrates a signal flow for modifying congestion control in accordance with certain embodiments.

FIG. 8 illustrates a signal flow modifying congestion control in accordance with certain embodiments. The client TCP proxy 602 (shown in FIG. 6) uses information about the mobile bandwidth on the network to set the value of the TCP initial window size. The MS 300 establishes a session 400 with the PGW/GGSN 214. The PCRF 308 delivers mobile subscriber information in communication 402 to the PGW/GGSN 214. The MS 300 establishes a TCP connection with a remote TCP server 406 over the Internet 126 (shown in FIG. 1) through PGW/GGSN 214. The session manager 508 (shown in FIG. 5) running on PGW/GGSN 214 splits the TCP connection into two TCP connections, 600, 606. The server 406 sets the size of the congestion window 408 to a small value, one packet, to avoid overwhelming the network. The server 406 increments the congestion window 408 linearly to congestion window 414, two packets, and congestion window 418, three packets, as specified by TCP slow start. Because the network between the TCP server 406 and the PGW/GGSN 214 is wired, the PGW/GGSN 214 receives the packets relatively faster than the mobile wireless network, as wireless delay is no longer involved in the TCP connection 606. For the TCP connection 600 between the PGW/GGSN 214 and the MS 300, the PGW/GGSN 214 uses mobile system information to set the initial window size of the congestion window 800. Because the PGW/GGSN 214 sets the initial window size of congestion window 800 to six based on mobile system information, the PGW/GGSN 214 can transmit the packets to the MS 300 in a single RTT and hence the MS 300 receives the first few packets quicker, resulting in better performance and a more satisfying user experience for the mobile consumer.

The congestion control modifications may be performed using mobile system information from Guaranteed Bit Rate (GBR) bearers, non-Guaranteed Bit Rate bearers, or multiple Traffic Performance Optimization (TPO) TCP connections.

At times, it is desirable to guarantee the bit rate for a subscriber on a GBR bearer. For example, if a subscriber is streaming a movie to his or her mobile device, the subscriber expects a certain service level for that experience. For the reasons explained above, the TCP protocol may hinder this experience unless certain modifications are made. In situations where the bandwidth is guaranteed, for example on GBR bearers, the slow start threshold is modified by the guaranteed bit rate that is determined by the quality of service (QoS) settings for that subscriber, and the slow start threshold is further modified by the round trip time. The slow start threshold is modified by the guaranteed bit rate and by the round trip time so that delay of acknowledgements sent at a rate higher than the guaranteed bit rate is not considered congestion. In situations where the bandwidth delay product is applicable to a GBR bearer, the initial window size is modified by a percentage of the overall bandwidth delay product (BDP) as determined by QoS settings for that mobile subscriber, and the percentage of the BDP is applied against the slow start threshold. The initial window size is modified by the bandwidth delay product mobile system information and by the slow start threshold to avoid sending packets at a rate that would overwhelm the capacity of the mobile network, which is described by the bandwidth delay product. Accordingly, if the guaranteed bit rate parameter increases, the client TCP proxy 602 increases the initial window size to reflect the increased bit rate guaranteed to the subscriber. If the guaranteed bit rate parameter decreases, the client TCP proxy 602 decreases the initial window size. If the bandwidth delay product parameter increases, the client TCP proxy 602 increases the initial window size to reflect the increased mobile network capacity. If the bandwidth delay product parameter decreases, the client TCP proxy 602 decreases the initial window size.

In some embodiments, the starting threshold and initial window are sized to account for the delays and guaranteed bandwidth as follows:

$$ssthresh = GBR \times minRTT \quad (1)$$

$$IW = iw\text{-}bdp\text{-}percentage \times ssthresh \quad (2)$$

In equation (1), GBR is the mobile QoS Guaranteed Bit Rate, ssthresh is the TCP slow start threshold, and minRTT is the TCP minimum Round Trip Time for a sender to send a packet and receive an acknowledgement. In equation (2), iw-bdp-percentage represents a percentage of the TCP initial window size and the mobile bandwidth delay product provided via the mobile network. IW-bdp-percentage represents a constant configured by the mobile operator. An operator can adjust the value closer to 0 or 1 to represent an operator's confidence that ssthresh results in improved network performance. The formula for ssthresh may be changed to the following $ssthresh = GBR \times minRTT \times C$ where C is a factor that varies according to the mobile wireless network conditions and can have a value greater than or equal to 1.

As described above, Guaranteed Bit Rate (GBR) is a bearer-level QoS parameter associated with each GBR bearer. GBR denotes the bit rate that can be expected to be provided by a GBR bearer. GBR is used by the policy and charging equipment function (PCEF) to determine resource reservation or allocation. The mobile bandwidth delay product (BDP) measures the maximum amount of data that may be on the mobile network at any point. That is, BDP measures the amount of data that may be transmitted by all senders without having been received by any receiver, before the network starts to drop or lose data packets.

In situations where the bandwidth is guaranteed, such as when data is carried with GBR bearers, the client TCP proxy 602 can use mobile system information about the guaranteed bit rate on the mobile network to modify the value of the TCP congestion control restart window size parameter. The client TCP proxy 602 modifies the restart window by a percentage of the bandwidth delay product that is determined by the QoS settings for that mobile subscriber, and the percentage of the bandwidth delay product is applied to the slow start threshold. As with the initial window size, the client TCP proxy 602 modifies the restart window size by the bandwidth delay product and by the slow start threshold so that delay of acknowledgements after a restart is not erroneously considered to be congestion. The restart window is used in TCP in a similar manner as described above with the TCP initial window. The TCP restart window is specified to limit the volume of data packets allowable to be sent when the client TCP proxy 602 is restarting transmission after an idle period. Therefore, the client TCP proxy 602 sets the value of the TCP restart window size in the same manner as the TCP initial window size, described above and illustrated in FIG. 8. Accordingly, if the guaranteed bit rate parameter increases, the client TCP proxy 602 increases the restart window size to reflect the increased bit rate available to the subscriber. If the guaranteed bit rate parameter decreases, the client TCP proxy 602 decreases the restart window size. If the bandwidth delay product parameter increases, the client TCP proxy 602 increases the restart window size to reflect the increased capacity of the mobile network. If the bandwidth delay product parameter decreases, the client TCP proxy 602 decreases the restart window size.

In situations where the maximum bit rate is limited, the client TCP proxy 602 uses mobile system information about the Maximum Bit Rate (MBR) and the smoothed round trip time to modify the maximum size of the congestion window. The TCP congestion window maximum size may be limited by the mobile MBR and by the SRTT to avoid bandwidth loss otherwise applied by the mobile network when exceeding the policed MBR. The actual size of the TCP congestion window may also be modified by the maximum size of the congestion window and by the maximum segment size. The actual size of the congestion window may be grown by the maximum size of the congestion window and by the maximum segment size because calculating this factor can provide a growth rate for the congestion window that is better tailored to the characteristics of the specific mobile network, instead of generically increasing the size of the congestion window by one packet (shown in FIG. 4). Accordingly, if the maximum bit rate increases on the mobile network, the client TCP proxy 602 increases the actual TCP congestion window size to reflect the increased bit rate. If the maximum bit rate decreases, the client TCP proxy 602 decreases the actual TCP congestion window size. The client TCP proxy 602 sets the maximum size and actual size of the congestion window as follows:

$$cwnd_{max} = MBR \times SRTT \quad (3)$$

$$cwnd = cwnd + (cwnd_{max} - cwnd)/cwnd_{max} \times MSS \quad (4)$$

In equation (3), $cwnd_{max}$ is the maximum size of the TCP congestion window, MBR is the mobile QoS Maximum Bit Rate, and SRTT is the TCP smoothed Round Trip Time. In equation (4), the client TCP proxy 602 increases the TCP congestion window size cwnd by a factor based on and scaled by $cwnd_{max}$ calculated in equation (3), and multiplied by the TCP maximum segment size MSS.

As described above, Maximum Bit Rate (MBR) is a bearer-level QoS parameter associated with each GBR bearer. MBR limits the bit rate that can be expected to be provided by a GBR bearer. MBR is used to describe the maximum bit rate that the Service Data Flow (SDF) may consume. Smoothed Round Trip Time (SRTT) is similar to Round Trip Time, which describes the time for a TCP sender to send an individual packet and receive an individual acknowledgement.

In some embodiments, it is desirable to decide based on mobile system information when no modification of congestion control parameters is applied. The client TCP proxy 602 calculates a TCP smoothed Round Trip Time (SRTT) and compares whether the SRTT is less than the mobile QoS Packet Delay Budget (PDB). This calculation determines whether the SRTT is within the time allowed by the PDB. If the SRTT is within the PDB, this means that the mobile network is meeting the guidelines determined by QoS, and no adjustment is applied to the TCP congestion window size.

As described above, Packet Delay Budget is a mobile wireless parameter associated with each QoS Class Identifier (QCI). PDB defines an upper bound for the time that a packet may be delayed between the UE and the PCEF. The PDB is interpreted as a maximum delay with a confidence level of 98%. For certain QCI, the value of PDB is the same in uplink and downlink.

In further embodiments, the client TCP proxy 602 modifies congestion control parameters by validating whether a mobile network is satisfying the promised mobile QCI characteristics. The client TCP proxy 602 calculates the fraction of retransmitted bytes compared to the total number of bytes to determine whether to adjust the congestion window. Calculating a fraction of retransmitted bytes compared to a total number of bytes infers probabilistically whether packet loss is due to congestion. If the loss appears due to congestion, the client TCP proxy 602 adjusts the congestion window accordingly. If the loss appears due to network or server factors other than congestion, the client TCP proxy 602 leaves the congestion window as is. In still further embodiments, the client TCP proxy 602 only uses a certain number of past bytes to compute the above fraction of retransmitted bytes to total number of bytes. The client TCP proxy 602 determines the appropriate number of past bytes based on the mobile QoS Packet Error Loss Rate for the mobile QCI. Empirically, the number of bytes generating the best results is according to the fraction c/PELR where c=2 or c=3. Accordingly, as the Packet Error Loss Rate increases, the client TCP proxy 602 decreases the actual congestion window size and maximum congestion window size. As the Packet Error Loss Rate decreases, the client TCP proxy 602 increases the actual congestion window size and maximum congestion window size.

As described above, PELR defines an upper bound for a rate of non-congestion-related packet loss on a mobile network. Specifically, PELR defines an upper bound for the rate of service data units (SDUs) (e.g., Internet Protocol packets) that have been processed by a sender but that are not successfully delivered by a corresponding receiver.

The congestion control modifications described above are based on mobile system information from GBR bearers supporting GBR and MBR information. As described above, the congestion control modifications may be performed using mobile system information from non-GBR bearers as well. For non-GBR bearers, the GBR and MBR mobile service information is not available. Instead, rate policing is based on APN-AMBR, policed by the P-GW 214, and UE-AMBR, policed by the UTRAN 206 (shown in FIG. 2). Accordingly, the APN-AMBR and UE-AMBR may be used as mobile system information to modify congestion control in a similar manner as the GBR and MBR information described above.

In some situations, it is desirable to use mobile system information about the allowable contention ratio to modify the initial window size or restart window size congestion control parameters. A contention ratio measures the number of users allowed to share the same data capacity on a network at once. The client TCP proxy 602 uses the mobile contention ratio to modify the initial window size or restart window size because the contention ratio may be a heuristic or estimate of bandwidth available to a bearer. As the allowable contention ratio increases, the client TCP proxy 602 decreases the initial window size or restart window size to accommodate a larger number of allowable users. As the allowable contention ratio decreases, the client TCP proxy 602 increases the initial window size or restart window size.

In addition to using mobile system information from GBR bearers and non-GBR bearers to modify congestion control, mobile system information may be used to modify congestion control for multiple traffic performance optimization (TPO) TCP connections as well. In some situations, it is desirable to sum the congestion windows across multiple linked TPO TCP connections to derive a total congestion window, and to limit the total congestion window across all linked TPO TCP connections to a maximum congestion window size, calculated as described above based on mobile system information including the total GBR for all connections. It is desirable to derive a total congestion window based on the total GBR because multiple TPO TCP connections can be acted upon by a single policy control and charging (PCC) rule. The bitrate information available at a PCC rule (or at a more aggregate level, such as bearer or Access Point Name (APN)) represents a bitrate that is split across multiple connections. In some embodiments, the client TCP proxy 602 does not simply split the available Guaranteed Bit Rate (GBR) or Maximum Bit Rate (MBR) equally across connections, because some connections may be idle (or using less bandwidth due to the nature of the application or service, such as the text-oriented communications facility telnet). Therefore, instead of limiting the TCP congestion window per TCP connection, the total TCP congestion window across all linked connections is limited to $cwnd_{max}$. This value is based on the mobile QoS total GBR for all TCP connections, and based on the assumption that the TCP Round Trip Time is expected to be roughly the same across connections since the TCP packets are destined to the MS 300 from the PGW/GGSN 214.

In further embodiments, it is desirable to modify congestion control among multiple TPO TCP connections by "lending" TCP congestion windows from an idle linked connection to a connection that can make use of the additional capacity. The client TCP proxy 602 "lends" congestion windows because the TPO TCP connections already relate to the same subscriber who is using both connections, and reusing a congestion window from an idle connection to a busy connection can improve the overall mobile experience for the subscriber. The client TCP proxy 602 allows a TCP connection limited by TCP congestion window to borrow and use TCP congestion windows from other TCP connections which are relatively idle, either because the other TCP connections are limited by their sending windows or limited by their applications. When a TCP connection which had previously lent its congestion window becomes limited by its congestion window at a later point in time, the client TCP proxy 602 allows the TCP connection to reclaim the TCP congestion window from the TCP connection which borrowed the window.

In some embodiments, it is desirable to modify the receive window congestion control parameter using mobile system information about the permitted bit rate. Setting the receive window size using mobile system information about the permitted bit rate allows the server proxy 604 to advertise to the TCP server 406 a receive window that limits the rate at which the TCP server 406 sends packets. The TCP server 406 adjusts the overall sending rate and it gets adjusted to the permitted bit rate. The PGW/GGSN 214 calculates a mobile QoS permitted bit rate based on mobile QoS negotiation or application usage scenarios. The session manager 508 uses the mobile QoS permitted bit rate to set the value of the TCP receive window size of the server TCP proxy 604. When the TCP server 406 receives the advertised value of the TCP receive window, the server 406 adjusts its send rate accordingly so as not to overwhelm the wired network or server TCP proxy 604. Therefore, the MS 300 receives TCP packets at the desired rate with less variability in the data rate.

In some situations, it is desirable to modify congestion control parameters based on mobile system information about handover, by configuring the mobile network and the client TCP proxy 602 to send and receive events relating to handover. One characteristic unique to mobile wireless networks is handover of a mobile device from one cell station to another. For example, handover occurs when the mobile device travels out of range of a first cell station and into range of a second cell station. Modifying congestion control using handover events is beneficial because handover affects TCP performance in a variety of ways that do not implicate network congestion. For example, handover can result in changes to available bandwidth, Round Trip Time, and temporary loss of a data routing path between the remote server and the mobile device. Handover, also referred to as handoff, can occur between network devices of the same network technology, such as SGSN-to-SGSN handoff. Handover can also occur between network devices of different network technology, such as between 3G and 4G technology. In some embodiments, the mobile network is configured to send an event indicating handoff start, and the client TCP proxy 602 is configured to receive events. The session manager can detect a handoff event based on accessed side signaling.

In some embodiments, congestion control modification incorporates handover between network devices of the same network technology. The client TCP proxy 602 modifies congestion control in one or more of the following ways after receiving an event indicating handover. The client TCP proxy 602 may restart Round Trip Time (RTT) and Retransmission Timeout (RTO) calculation based on the first packet sent after handoff. The client TCP proxy 602 may ignore duplicate packet acknowledgements, instead of considering duplicate acknowledgements to indicate congestion. This is because duplicate packet acknowledgements may instead indicate packet drops due to handoff. The client TCP proxy 602 may ignore a congestion window adjustment for the next RTT if RTO is triggered after the handoff event. The client TCP proxy 602 may undo congestion window adjustment if RTO is triggered before the handoff event. The client TCP proxy 602 may restart bandwidth estimation (BWE) for TCP congestion avoidance algorithms.

In some embodiments, congestion control modification incorporates mobile system information about inter-technology handover between network technologies such as 3G and 4G. When inter-technology handover is beginning, the client TCP proxy 602 modifies congestion control in one or more of the following ways after receiving an event indicating handover start. The client TCP proxy 602 stops forwarding packets; stops the retransmission timeout (RTO) and retransmission; and does not consider duplicate packet acknowledgements to indicate congestion, instead considering duplicate packet acknowledgements to indicate packet drops due to handoff for the next one RTT. If handover is between an LTE network and an eHRPD network, the resulting data session may be a PGW session. If handover is between an LTE network and a HSDPA/HSUPA network, the data session may be migrated between a GGSN and a PGW.

In further embodiments, it is desirable to send events indicating handover completion to modify congestion control by sending events indicating that handover is complete. After handover is complete, the mobile network is configured to send an event indicating handover completion. On receiving a handover complete event, the client TCP proxy 602 modifies one or more of Round Trip Time, congestion window, and bandwidth. In an example embodiment, the client TCP proxy 602 restarts the TCP congestion control algorithm, which recomputes all TCP parameters to adjust to the new network conditions.

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, Apple's iOS, Research In Motion's Blackberry OS, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVRs), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of input-output interfaces such as a keyboard, a touch screen, a trackball, a touch pad, and/or a mouse. The user equipment may also include speakers and a display device in some embodiments.

The congestion control modification gateway described above may be implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The congestion control modification gateway can be implemented as any combination of the following including an xGSN, an xGW, an xGW-SGW, and an xGW-PGW.

Figure 9:
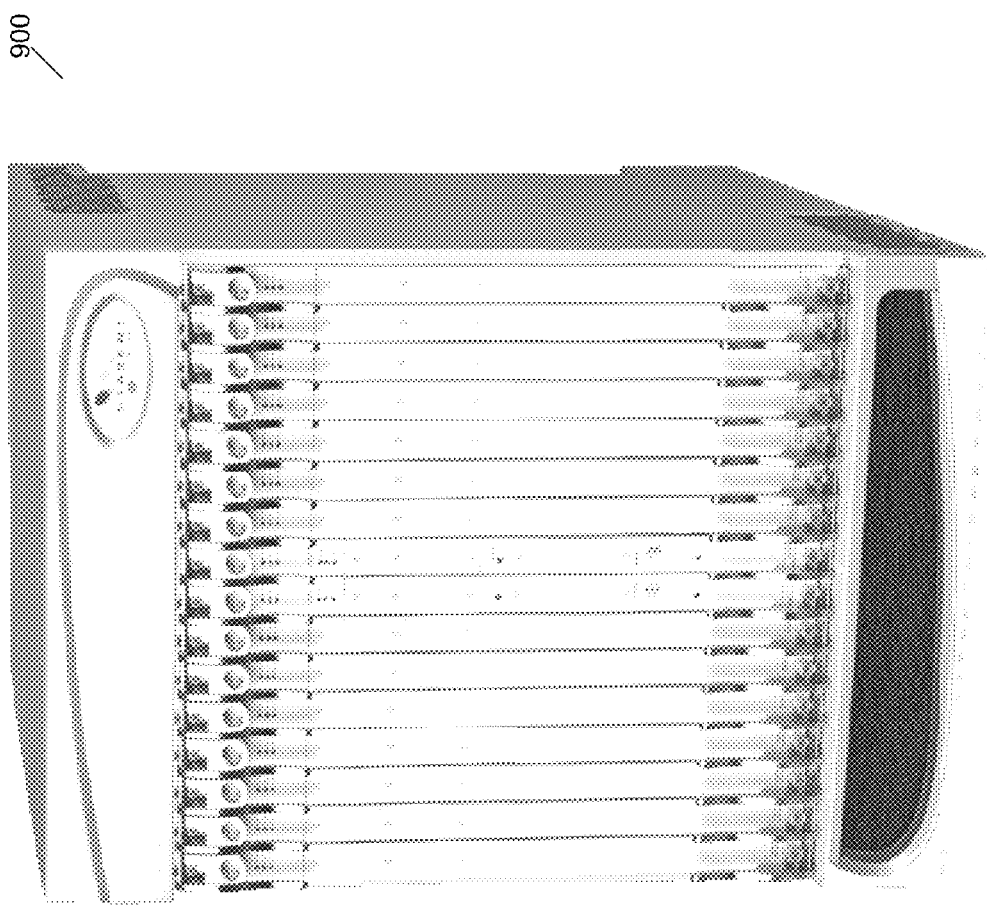
FIGS. 9-10 illustrate a network device configuration in accordance with certain embodiments.
Figure 10:
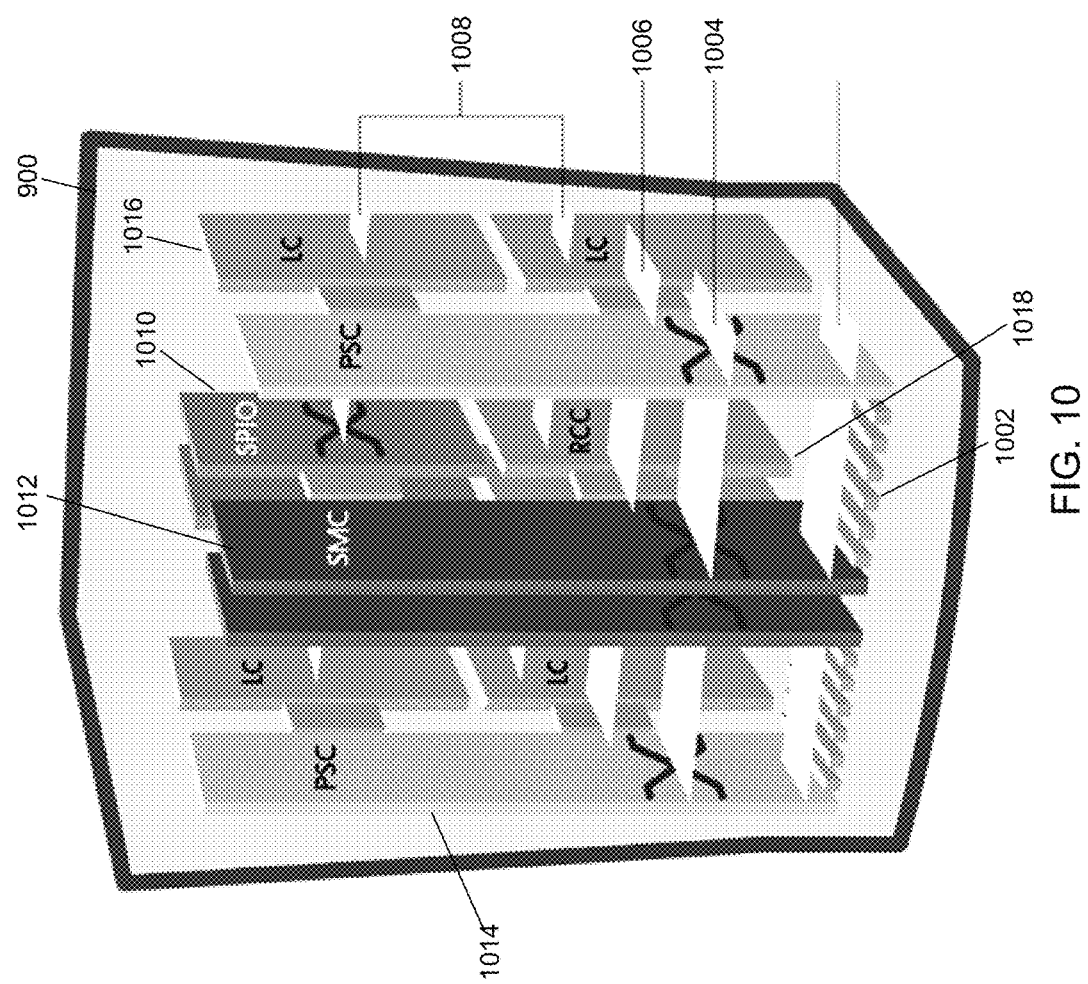

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 9 illustrates a network device 900 in accordance with some embodiments. FIG. 10 illustrates the implementation of a network device in accordance with some embodiments. The network device 900 includes slots 1002 for loading application cards and line cards. A midplane can be used in the network device to provide intra-network device communications, power connections, and transport paths between the various installed cards. The midplane can include buses such as a switch fabric 1004, a control bus 1006, a system management bus, a redundancy bus 1008, and a time division multiplex (TDM) bus. The switch fabric 1004 is an IP-based transport path for user data throughout the network device implemented by establishing inter-card communications between application cards and line cards. The control bus 1006 interconnects the control and management processors within the network device. The network device management bus provides management of system functions such as supplying power, monitoring temperatures, board status, data path errors, card resets, and other failover features. The redundancy bus 1008 provides transportation of user data and redundancy links in the event of hardware failures. The TDM bus provides support for voice services on the system.

The network device supports at least four types of application cards: a switch processor I/O card (SPIO) 1010, a system management card (SMC) 1012, a packet service card (PSC) 1014, and a packet accelerator card (not shown). Other cards used in the network device include line cards 1066 and redundant crossbar cards (RCC) 1018. The line cards 1016, when loaded in the network device, provide input/output connectivity to the network and other devices, as well as redundancy connections. The line cards 1016 include interfaces to the network through Ethernet, Fiber Optic, and the other communication mediums. The redundant crossbar card (RCC) 1018 includes a non-blocking crossbar and connections to each of the cards in the network device. This allows a redundant connection to be made through the redundant crossbar card 1018 from any one card to any other card in the network device. The SPIO card 1010 serves as a controller of the network device and is responsible for such things as initializing the network device and loading software configurations onto other cards in the network device.

The system management card (SMC) 1012 and switch processor card (not shown) are system control and management cards for managing and controlling other cards in the network device. The packet accelerator card (PAC) and packet service card (PSC) 1014 provide packet processing, context processing capabilities, and forwarding capabilities among other things. The PAC and PSC 1014 perform packet-processing operations through the use of control processors and a network processing unit. The network processing unit determines packet processing usage; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network usage changes, hardware resources can be dynamically deployed to meet the usage scenarios in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 11:
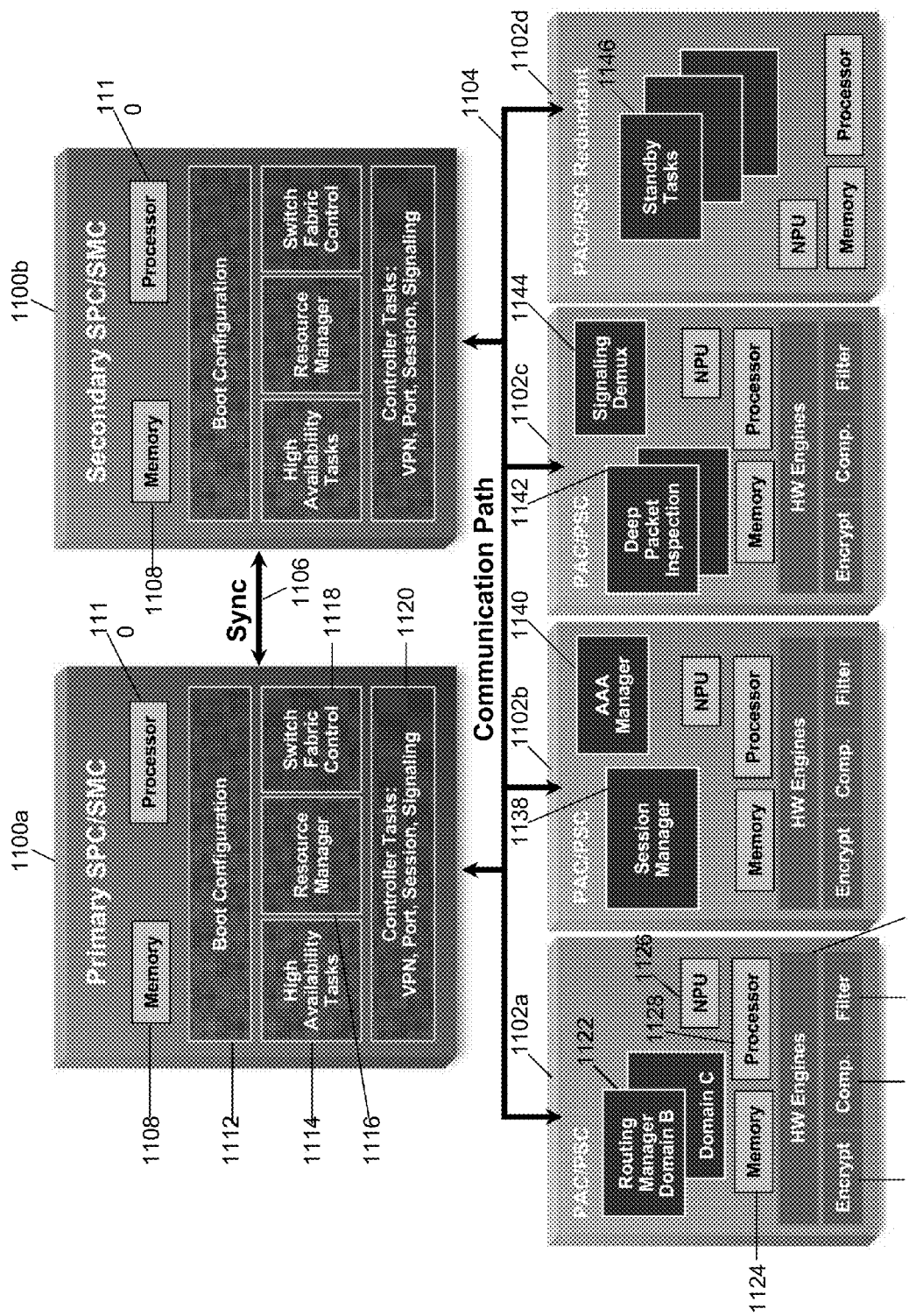
FIG. 11 illustrates an architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network usage grows and call models change, hardware resources can be added to accommodate processes, such as encryption, packet filtering, etc., that utilize more processing power. FIG. 11 illustrates a logical view of the software architecture of a network device in accordance with certain embodiments. As shown, the software and hardware can be distributed within the network device and across different circuit boards, processors, and memory. FIG. 11 includes a primary switch processor card (SPC)/system management card (SMC) 1100a, a secondary SPC/SMC 1100b, PAC/PSC 1102a-1102d, a communication path 1104, and a synchronization path 1106. The SPC/SMC 1100 include a memory 1108, a processor 1110, a boot configuration 1112, high availability tasks 1114, resource manager 1116, switch fabric control 1118, and controller tasks 1120.

The SPC/SMC 1100 manage and control the network device including the other cards in the network device. The SPC/SMC 1100 can be configured in a primary and secondary arrangement that provides redundancy and failsafe protection. The modules or tasks running on the SPC/SMC 1100 are related to network device wide control and management. The boot configuration task 1112 includes information for starting up and testing the network device. The network device can also be configured to startup in different configurations and providing different implementations. These can include which functionalities and services are capable of running on the SPC/SMC 1100. The high availability task 1114 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the network model and specific process use cases. For example, most tasks can be configured to execute on SPC/

SMC 1100 or a PAC/PSC 1102, while some processor intensive tasks can also be performed across multiple PACs/PSCs to utilize multiple CPU resources. Distribution of these tasks is invisible to the user. The switch fabric control 1118 controls the communication paths in the network device. The controller tasks module 1120 can manage the tasks among the resources of the networks to provide, for example, VPN services, assign ports, and create, delete, and modify sessions for user equipment.

The PAC/PSC 1102 are high-speed processing cards that are designed for packet processing and the tasks involved with providing various network functionalities on the network device. The PAC/PSC 502 include a memory 1124, a network processing unit (NPU) 1126, a processor 1128, a hardware engine 1130, an encryption component 1132, a compression component 1134, and a filter component 1136. Hardware engines 1130 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1102 is capable of supporting multiple contexts. The PAC/PSC 1102 are also capable of running a variety of tasks or modules. PAC/PSC 1102a provides routing managers 1122 with each covering routing of a different domain. PAC/PSC 1102b provides a session manager 1138 and an AAA manager 1140. The session manager 1138 manages one or more sessions that correspond to one or more user equipment. A session allows a user equipment to communicate with the network for voice calls and data. The AAA manager 1140 manages accounting, authentication, and authorization with an AAA server in the network. PAC/PSC 1102 provides a deep packet inspection task 1142 and a signaling demux 1144. The deep packet inspection task 1142 provides inspection of packet information beyond layer 4 for use and analysis by the network device. The signaling demux 1144 can provide scalability of services in combination with other modules. PAC/PSC 1102d provides redundancy through standby tasks 1146. Standby tasks 1146 store state information and other task information so that the standby task can immediately replace an active task if a card fails or if there is a scheduled event to remove a card.

In some embodiments, the software for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, an SGW may implement a TCP proxy to use mobile QoS parameters to modify TCP congestion control parameters.

We claim:

1. A method comprising:
    receiving, at a gateway from a server, at least one data packet directed to a mobile device, wherein the at least one data packet is sent by the server in accordance with a first one or more Transmission Control Protocol (TCP) congestion control parameters that affect a first rate at which packets can be sent from the server to the mobile device;
    receiving, at the gateway, one or more quality of service (QoS) parameters associated with the mobile device, wherein the one or more QoS parameters define the quality of service to be provided to the mobile device, wherein at least a portion of a mobile network couples the gateway to the mobile device, and wherein a first QoS parameter of the one or more QoS parameters defines the mobile device as a Guaranteed Bit Rate (GBR) bearer associated with a specified bit rate;
    determining, by the gateway and based on the received one or more QoS parameters, a second one or more TCP congestion control parameters that affect a second rate at which packets can be sent from the gateway to the mobile device, wherein the second one or more TCP congestion control parameters are determined after the first one or more TCP congestion control parameters are determined, and further comprising:
        calculating a TCP slow start threshold value based on the specified bit rate of the first QoS parameter and a TCP round trip time; and
        setting a TCP slow start threshold of the second one or more TCP congestion control parameters as the calculated TCP slow start threshold value; and
    sending, by the gateway, the at least one data packet to the mobile device in accordance with the second one or more TCP congestion control parameters.

2. The method of claim 1, wherein the second one or more TCP congestion control parameters include a TCP window size determined by the gateway based on one or more QoS bit rates of the received one or more QoS parameters.

3. The method of claim 1, wherein the second one or more TCP congestion control parameters include a TCP initial window size and a TCP slow start threshold determined by the gateway based on one or more QoS bit rates of the received one or more QoS parameters.

4. The method of claim 1, wherein the second one or more TCP congestion control parameters include a TCP initial window size and a TCP slow start threshold determined by the gateway based on a QoS guaranteed bit rate (GBR) and a QoS bandwidth delay product (BDP) of the received one or more QoS parameters.

5. The method of claim 1, further comprising setting a TCP initial window size and the TCP slow start threshold of the second one or more TCP congestion control parameters by multiplying, by the gateway, the specified bit rate of the first QoS parameter and the TCP round trip time to calculate the TCP slow start threshold value, and by multiplying the TCP slow start threshold by a percentage of an overall QoS bandwidth delay product to calculate the TCP initial window size, to specify a rate at which packets are sent over the mobile network.

6. The method of claim 1, further comprising deriving a total congestion window size across a plurality of traffic performance optimization (TPO) TCP connections, and setting the total congestion window size to a maximum congestion window size based on the one or more QoS parameters.

7. The method of claim 1, further comprising receiving, at the gateway, events relating to mobile handover to a new mobile cell station, and modifying the second one or more TCP congestion control parameters in response to mobile handover to incorporate QoS mobile system information about the new mobile cell station.

8. The method of claim 1, further comprising setting a receive window size towards the server based on QoS parameters.

9. A gateway comprising:
at least one processor to:
receive, from a server, at least one data packet directed to a mobile device, wherein the at least one data packet is sent by the server in accordance with a first one or more Transmission Control Protocol (TCP) congestion control parameters that affect a first rate at which packets can be sent from the server to towards the mobile device;
receive one or more quality of service (QoS) parameters associated with the mobile device, wherein the one or more QoS parameters define the quality of service to be provided to the mobile device, and wherein a first QoS parameter of the one or more QoS parameters defines the mobile device as a Guaranteed Bit Rate (GBR) bearer associated with a specified bit rate;
determine, based on the received one or more QoS parameters, a second one or more TCP congestion control parameters that affect a second rate at which packets can be sent from the gateway to the mobile device, wherein the second one or more TCP congestion control parameters are determined after the first one or more TCP congestion control parameters are determined, and further comprising:
calculating a TCP slow start threshold value based on the specified bit rate of the first QoS parameter and a TCP round trip time; and
setting a TCP slow start threshold of one of the second one or more TCP congestion control parameters as the calculated TCP slow start threshold value; and
send the at least one data packet to the mobile device in accordance with the second one or more TCP congestion control parameters.

10. The gateway of claim 9, wherein the second one or more TCP congestion control parameters include a TCP window size determined by the at least one processor of the gateway based on one or more QoS bit rates of the received one or more QoS parameters.

11. The gateway of claim 9, wherein the second one or more TCP congestion control parameters include a TCP initial window size and a TCP slow start threshold determined by the at least one processor of the gateway based on one or more QoS bit rates of the received one or more QoS parameters.

12. The gateway of claim 9, wherein the second one or more TCP congestion control parameters include a TCP initial window size and a TCP slow start threshold determined by the at least one processor of the gateway based on a QoS guaranteed bit rate (GBR) and a QoS bandwidth delay product (BDP) of the received one or more parameters.

13. The gateway of claim 9, wherein the at least one processor is further to manage transmission of data by setting a TCP initial window size and a TCP slow start threshold of the second one or more TCP congestion control parameters by multiplying the specified bit rate of the first QoS parameter and the TCP round trip time to calculate the TCP slow start threshold, and by multiplying the TCP slow start threshold by a percentage of an overall QoS bandwidth delay product to calculate the TCP initial window size, to specify a rate at which packets are sent over the mobile network.

14. The gateway of claim 9, wherein the at least one processor is further to derive a total congestion window size of the second one or more TCP congestion control parameters across a plurality of traffic performance optimization (TPO) TCP connections, and setting the total congestion window size to a maximum congestion window size based on the one or more QoS parameters.

15. The gateway of claim 9, wherein the at least one processor is further to receive events relating to mobile handover to a new mobile cell station and manage transmission of data by modifying the second one or more TCP congestion control parameters in response to mobile handover to incorporate QoS mobile system information about the new mobile cell station.

16. The gateway of claim 9, wherein the at least one processor is further to manage transmission of data by setting a receive window size towards the server based on QoS parameters.

17. One or more non-transitory media comprising logic that when executed is to:
receive, at a gateway from a server, at least one data packet directed to a mobile device, wherein the at least one data packet is sent by the server in accordance with a first one or more Transmission Control Protocol (TCP) congestion control parameters that affect a first rate at which packets can be sent from the server to the mobile device;
receive, at the gateway, one or more quality of service (QoS) parameters associated with the mobile device, wherein the one or more QoS parameters define the quality of service to be provided to the mobile device, wherein at least a portion of a mobile network couples the gateway to the mobile device, and wherein a first QoS parameter of the one or more QoS parameters defines the mobile device as a Guaranteed Bit Rate (GBR) bearer associated with a specified bit rate;
determine, by the gateway and based on the received one or more QoS parameters, a second one or more TCP congestion control parameters that affect a second rate at which packets can be sent from the gateway to the mobile device, wherein the second one or more TCP congestion control parameters are determined after the first one or more TCP congestion control parameters are determined, and further comprising:
calculating a TCP slow start threshold value based on the specified bit rate of the first QoS parameter and a TCP round trip time; and
setting a TCP slow start threshold of one of the second one or more TCP congestion control parameters as the calculated TCP slow start threshold value; and
send, by the gateway, the at least one data packet to the mobile device in accordance with the second one or more TCP congestion control parameters.

18. The media of claim 17, wherein the second one or more TCP congestion control parameters include a TCP window size determined by the gateway based on one or more QoS bit rates of the received one or more QoS parameters.

19. The media of claim 17, wherein the second one or more TCP congestion control parameters include a TCP initial window size and a TCP slow start threshold determined by the gateway based on one or more QoS bit rates of the received one or more QoS parameters.

20. The media of claim 17, wherein the second one or more TCP congestion control parameters include a TCP initial window size and a TCP slow start threshold determined by the gateway based on a QoS guaranteed bit rate (GBR) and a QoS bandwidth delay product (BDP) of the received one or more QoS parameters.

21. The media of claim 17, wherein the logic is further to derive a total congestion window size across a plurality of traffic performance optimization (TPO) TCP connections and to set the total congestion window size to a maximum congestion window size based on the one or more QoS parameters.

22. The media of claim 17, the logic further to receive, at the gateway, events relating to mobile handover to a new mobile cell station, and logic operable to modify one or more TCP congestion control parameters in response to mobile handover to incorporate QoS mobile system information about the new mobile cell station.

23. The media of claim 17, the logic further to set a receive window size towards the server based on QoS parameters.

24. The method of claim 1, further comprising:
splitting, by a TCP proxy, a TCP connection between the server and the mobile device into a first TCP connection between the mobile device and the gateway and a second TCP connection between the server and the gateway and wherein the first one or more congestion control parameters manage congestion control behavior for packets sent via the second TCP connection between the server and the gateway and the second one or more congestion control parameters manage congestion control behavior for packets sent via the first TCP connection between the mobile device and the gateway.

25. The method of claim 1, further comprising:
sending, by the gateway to the server, an acknowledgement indicating reception of the at least one data packet prior to receiving, by the gateway from the mobile device, an acknowledgement indicating reception by the mobile device of the at least one data packet.

26. The method of claim 1, wherein determining the second one or more TCP congestion control parameters based on the received one or more QoS parameters comprises:
setting a first initial window size of a congestion window based on a guaranteed bit rate (GBR) of the one or more QoS parameters; and
upon determining that the GBR has changed, setting a second initial window size of the congestion window based on the changed GBR.

* * * * *